Sept. 19, 1967  A. G. BODINE  3,342,076
SONIC RESONATOR FOR USE WITH SONICALLY DRIVEN APPARATUS
Filed Oct. 15, 1965  10 Sheets-Sheet 1
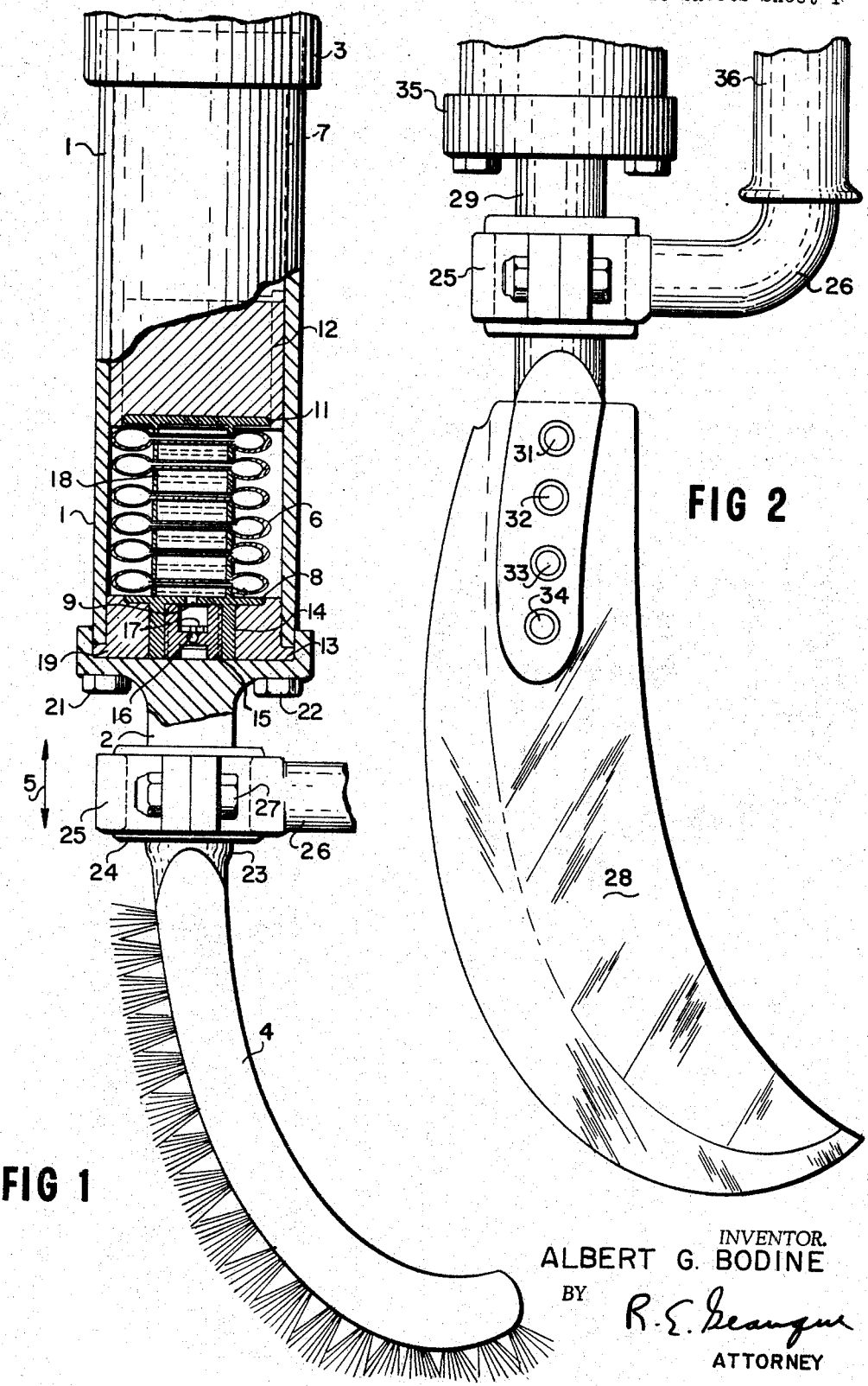
INVENTOR.
ALBERT G. BODINE
BY R. E. Geauque
ATTORNEY

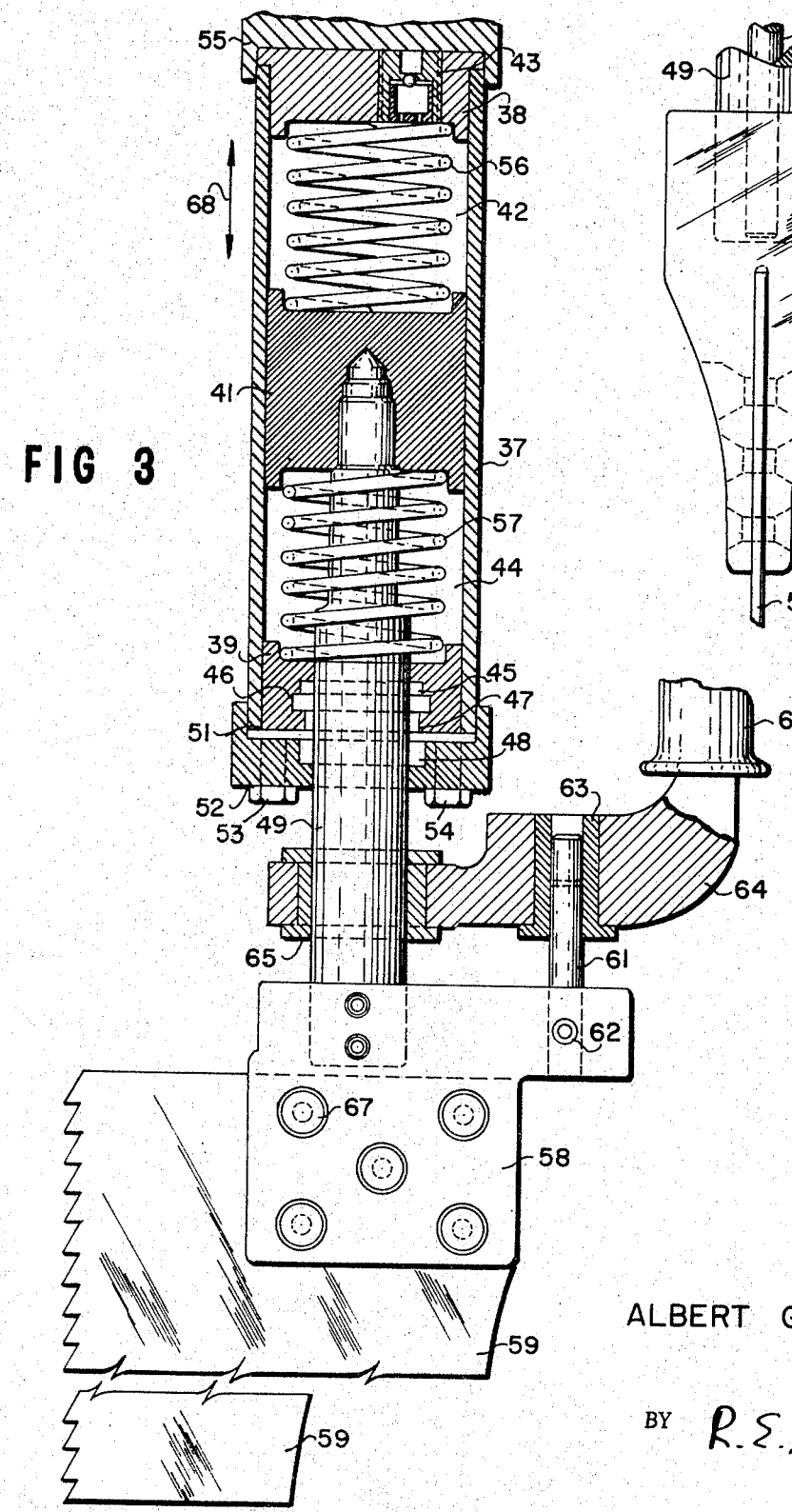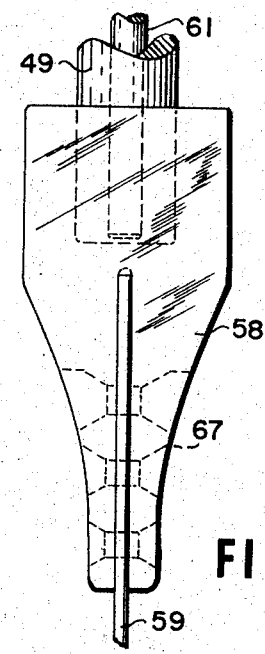

Sept. 19, 1967  A. G. BODINE  3,342,076
SONIC RESONATOR FOR USE WITH SONICALLY DRIVEN APPARATUS
Filed Oct. 15, 1965  10 Sheets-Sheet 3

ALBERT G. BODINE
INVENTOR.

BY  R. E. Geauque
ATTORNEY

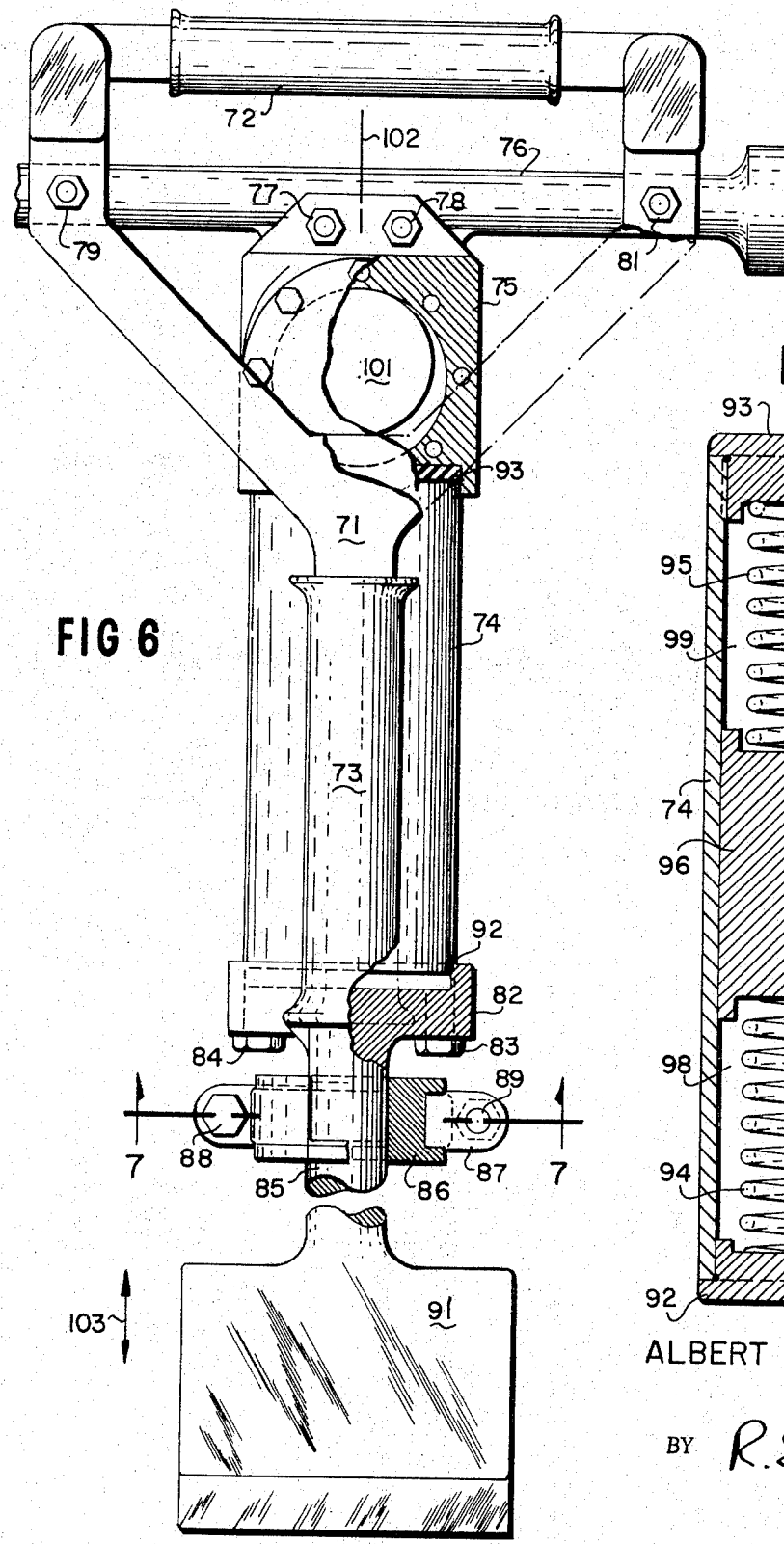
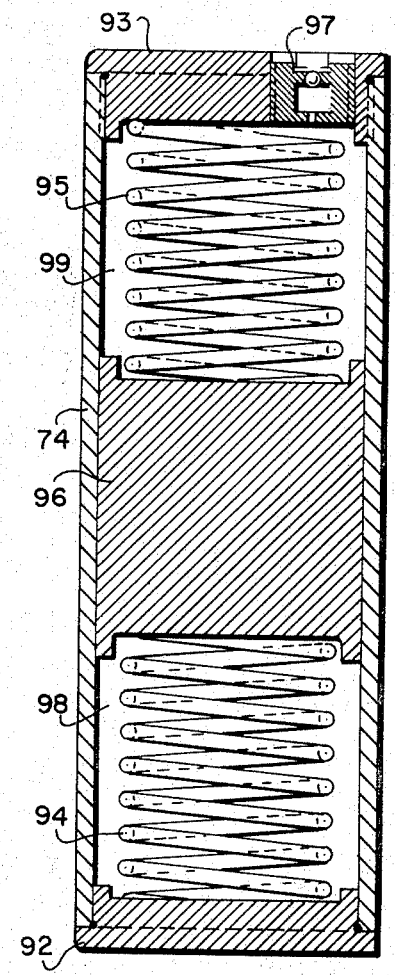

Sept. 19, 1967  A. G. BODINE  3,342,076
SONIC RESONATOR FOR USE WITH SONICALLY DRIVEN APPARATUS
Filed Oct. 15, 1965  10 Sheets-Sheet 6

ALBERT G. BODINE
INVENTOR.

BY R. E. Geauque
ATTORNEY

INVENTOR.
ALBERT G. BODINE
BY
R. E. Geauque
ATTORNEY

Sept. 19, 1967 A. G. BODINE 3,342,076
SONIC RESONATOR FOR USE WITH SONICALLY DRIVEN APPARATUS
Filed Oct. 15, 1965 10 Sheets-Sheet 10

ALBERT G. BODINE
INVENTOR.

BY R. E. Geangue
ATTORNEY

United States Patent Office 3,342,076
Patented Sept. 19, 1967

3,342,076
SONIC RESONATOR FOR USE WITH SONICALLY DRIVEN APPARATUS
Albert G. Bodine, 7877 Woodley Ave., Van Nuys, Calif. 91406
Filed Oct. 15, 1965, Ser. No. 496,468
18 Claims. (Cl. 74—87)

Specification

This invention relates to sonic tools and more particularly to an impedance matching device which is to be coupled into an elastically vibratory resonant system comprising a sonic wave generator and a driven member.

There is disclosed in one of my copending patent applications, a tool which is driven from a roller type of sonic generator such as shown in my Patent No. 2,960,314. While the inventions disclosed therein have been satisfactory, it has been found that an improvement in the efficiency and power output of the devices disclosed therein may be obtained by the inclusion of an impedance matching device of the type disclosed hereinafter.

A large number of industrial uses for high power sonic vibrations have been discovered. More particularly many types of power tools have been developed which operate by sonic energy of high intensity. One illustrative example involves a longitudinally extended elastic bar, in which a longitudinally resonant standing wave is set up and maintained, so that one end of the bar becomes the location of a velocity antinode of the standing wave, and is utilized to vibrate a tool bit or other tool member against the work. Modes of vibration, other than a longitudinally resonant standing wave, such as lateral or gyratory wave modes, are within the scope of the invention. Other illustrative examples will appear in the ensuing description. The bodies or devices to be sonically vibrated at resonance are often characterized by high acoustic impedance. In many instances it is preferred to use a fairly high impedance resonator, such as a steel bar having the necessary acoustical inductance and capacitance, to gain the desired frequency. Such devices vibrate with great force, and with small velocity amplitude. Other applications, however, require a larger velocity amplitude. For such applications a low impedance driver is preferred since they are generally characterized by a relatively low force but substantial velocity.

The present invention is concerned with low impedance systems for any desired frequency. Low impedance sources of sonic energy are better suited for working into certain low impedance loads, where substantial motion is desired in the vibratory cycle. Typical of the devices which present such low impedance loads are systems incorporated in sonic casting cleaners, sonic brushes, sonic scrapers, sonic knives, etc. Also, devices having as their load soft or loose material are preferably low impedance systems.

It has been found that a preferred form of low impedance resonance system is one where the capacitive reactance is provided by a fluid and the inductive reactance is provided by a solid mass which is resonated in a cyclic stroke by the fluid capacitance. In such a system the fluid may be either a liquid or a compressed gas and the solid mass may be in the form of a piston or cylindrical slug. The present invention is based upon this general concept, and has a number of inherent advantages. The fluid capacitance is fatigue-proof, and thus can be driven over a large amplitude and for an indefinite period of time, without failure due to fatigue.

Various embodiments of the invention will be shown and described, and as applied to various types of sonically driven tools or sonically energized processes, but in all cases the apparatus of the invention provides an acoustical circuit having an inductive reactance (L) element and a capacitive reactance (C) element for coupling into a system comprising a sonic wave oscillator and a driven tool, and in which the capacitive reactance is provided by a fluid and the inductive reactance is provided by a resonantly driven mass. A number of benefits will result from this construction, one of which is that the resonator tunes out the mass of the sonic oscillator primarily along a single path, which is desirable in most uses since the desired vibratory motion is usually in but one direction.

In any event, the resonator is employed primarily to function at a sonic frequency to "tune out" the mechanical oscillator body and the tool member. In this way the inductive impedances of the entire system are reduced to zero, and the only impedance that the force-generating element in the sonic oscillator or generator sees is the resistive impedance of the work. Thus, the whole system becomes frequency dependent. To obtain any desired frequency the volume of the fluid (and the pressure, if a gas is used), is selected in relation to the above-mentioned inductive reactance element (mass) to result in the desired frequency.

The system of the present invention is especially effective with roller type oscillators as described in my above-mentioned Patent No. 2,960,314. Oscillators of this type are dependent upon the resonant frequency of the driving element. This is due to a unique sonic vibration generating method involving the driving of an inertia-mass rotor in a cyclical or orbital path under the guiding constraint of a stroke limiting or bearing means. In this method a periodic force impulse is exerted on the rotor, and the coupling of the bearing means to a vibratory device having a given resonant frequency range will cause the periodic force impulse, or a component thereof, to be effective to resonantly vibrate the device in the given range. To this end, the inertia-mass rotor is driven at an orbital frequency which generates a vibration frequency in the range of resonance for the driving element. The driving element, when so vibrating in its resonance range, with its vibration amplitude amplified by resonance, back-reacts with the orbital rotor, strongly constraining the rotor to an orbital periodicity corresponding to its own natural frequency. The inherent characteristic of such system is that it tends to operate on the low side of the frequency which would give the peak resonant amplitude, and further, the whole apparatus, comprising the driven vibratory device and the orbiting rotor, tends to lock in synchronously slightly below the frequency for peak resonant amplitude. The orbiting rotor is strongly constrained to produce this frequency, and while it would be possible to drive the rotor with sufficient power to reach a threshold condition where it would break over the peak amplitude resonance frequency, a very substantial increase in power input would be required before this unwanted condition could occur. Therefore, in a practical system the input power is deliberately limited to a value below such a threshold condition. By this means, the rotor is prevented from overspeeding and destroying itself or its housing when operated at high frequency.

In addition to those effects, the constraint which keeps the frequency of the orbiting rotor to the low side of the amplitude-versus-frequency resonance curve of the driven device is effective to establish a particular phase angle between the rotor motion and the motion of the vibrating device which will result in maximum power being delivered to the vibrating device for a given power input to the rotor.

The apparatus of the present invention, when incorporated into a system driven by a sonic wave oscillator of the above-described type, gives good "feedback" coupling to the oscillator orbit and impulse. In fact, a wholly new result arises from the combination of the structure of the present invention with an orbiting mass oscillator or sonic wave oscillator as described above, in that the fluid capacitance element acts as an isolator or acoustic filter which blocks or attenuates shock pulses which would otherwise be reflected back from the tool to the oscillator rotor. This arrangement prevents such shock pulses from influencing the free-rolling orbiting mass of the oscillator since such spurious pulses would otherwise appear as a component of the frequency used to control the synchronization of the orbiting mass. An excellent control of sonic phase angle and power factor results from this combination.

Another advantage of the present invention is that because of its ability to accommodate vibrating systems having large masses, it is able to maintain a sonic vibrating system at a reasonably high resonant frequency even in those instances where the work piece or work load itself would otherwise tend to load the system with an undesirable mass.

Still another advantage of the present invention is that it tends to be unidirectional with reference to the resonant pattern produced. That is, the system provides its maximum resonant amplitude gain along a single direction line notwithstanding the fact that the orbiting mass oscillator, employed to excite the system, by putting out a rotating force vector generates its output force in many directions. The unidirectional force-transmitting characteristic of the fluid-filled resonator of the present invention substantially confines this omnidirectional force output into a substantially single usable direction along the desired vibration path.

Because the combination of the apparatus of the present invention and a high-impedance sonic oscillator permits a relatively large amplitude of vibration to be generated without having the peak stress problems normally experienced with solid elastic resonators in the form of bars and the like, an unusually high-powered and compact system, which is especially effective where portability is required, may be obtained.

An inherent advantage of the fluid resonator mechanism of the invention, particularly in the gas-filled embodiment, is that it is somewhat nonlinear in operation and therefore tends to increase the resonant frequency of the system with an increase in amplitude of the developed sonic energy. This is especially effective when used with an orbiting mass oscillator because, in practical terms, there will be an increase in acoustic Q with an increase in power loading, and such relationship is uniquely provided by the system of the present invention.

In summary, the foregoing features and advantages of the present invention reside in a system in which an inductive mass oscillator is made to convert its input force efficiently to the desired sonic form notwithstanding the fact that the housing of the oscillator is moving with a large stroke amplitude while functioning as an element of the acoustic resonant circuit. The fluid-filled resonator combination of the present invention permits an orbiting mass type of sonic oscillator to "stay with" the relatively large vibration amplitude attainable by means of the invention, at the tool or driven element.

It is therefore a principal object of the present invention to provide a novel and improved fluid resonator for use in sonically driven devices.

Another object of the invention is to provide a novel and improved acoustic circuit of the LC type in which the capacitive reactance is provided by a confined fluid and the inductive reactance is provided by a cyclically displaceable lumped mass.

Still another object of the present invention is to provide a novel and improved sonically driven device having both a higher force output and a higher amplitude output than can be provided by similar devices heretofore intended to accomplish generally similar purposes.

Another object of the invention is to provide an improved impedance matching element for incorporation into sonically energized tools.

Yet another object of the invention is to provide novel and improved fluid resonator means for increasing the acoustic Q of sonically energized systems.

It is yet another object of the invention to provide a novel and improved fluid resonator for elastically vibratory resonant systems which increases the energy conversion and utilization characteristics of such systems.

Other objects of the invention will in part be obvious and will in part appear hereinafter.

The features of this invention which are believed to be novel are set forth with particularity in the appended claims. The present invention itself, both as to its organization and manner of operation, together with further objects and advantages thereof may best be understood by reference to the following description taken in connection with the accompanying drawings, in which like reference characters refer to similar parts throughout the several views and in which:

FIGURE 1 is an elevational view, partially in section, of a sonically driven tool having a brush attachment, which tool incorporates the novel fluid-capacitance, inductive-mass, resonator of the present invention.

FIGURE 2 is a fragmentary elevational view of the apparatus of FIGURE 1 in which the brush attachment has been replaced with a sonically driven knife attachment.

FIGURE 3 is an elevational view, partially in section, of an alternate embodiment of the invention as incorporated into a sonically driven saw.

FIGURE 4 is a fragmentary side view of the apparatus of FIGURE 3.

FIGURE 6 is a front elevational view of the apparatus of FIGURE 5.

FIGURE 8 is a detailed vertical sectional view of the apparatus shown in FIGURE 6.

Figure 5:
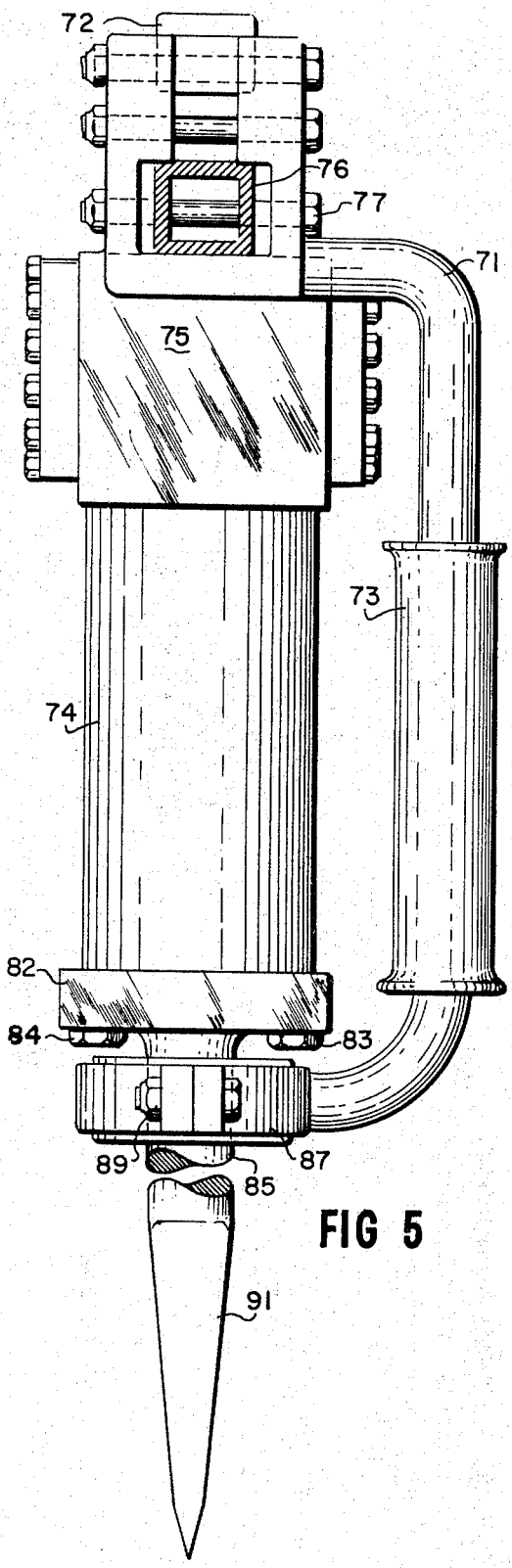
FIGURE 5 is a side elevation view of a sonically powered chisel incorporating a sonic resonator constructed in accordance with the invention.

Although certain features of the invention may be applied to various sonically driven tools, it will be convenient to describe the invention in connection with exemplary ones of the many sonically driven tools or machines to which the apparatus of the invention may be applied, such as sonically driven brushes, knives, chisels, and the like.

Having gained an understanding of these forms of the invention, persons skilled in the art will appreciate the manner in which the principles of the invention may be applied in other sonically driven devices.

Looking now at FIGURE 1 there is shown a sonically driven tool having a brush attachment and which incorporates the sonic resonator of the present invention in its construction. This device comprises a cylindrical body 1 to which is attached a tool-holding fixture 2 at its lower end and an outer cylinder 3 at its upper end. Cylinder 3 contains the sonic wave source, which may be, for example an orbiting mass oscillator of the type shown and described in my Patent 2,960,314. Body 1 contains the fluid resonator apparatus of the invention and has its output coupled to brush 4 via fixture 2. In use, reciprocating motion, at a sonic frequency, is imparted to the brush 4 along the direction indicated by arrow 5. The sonic wave generator or orbiting mass oscillator, which is not shown in FIGURE 1, may be driven from any type of rotary prime mover such as an electric or hydraulic motor, or the like. It is to be understood that inasmuch as the sonic wave generator does not constitute part of the present invention, only so much of the structural details and operational features thereof considered to be essential for a complete understanding of this invention are described herein. Reference should be made to the aforementioned Patent No. 2,960,314 and/or to my Patent No. 3,033,158 for a more complete description of devices of this type. The output of the sonic wave generator is in the form of a substantially sinusoidal stroke imparted to body 1. This sinusoidal motion is transmitted to fixture 2 and to the components of the fluid resonator.

The fluid resonator contained within body 1 is referred to as the metal bellows type and comprises a pair of bellows capsules, one of which is shown in detail at 6, and the other of which is indicated in dotted outline at 7. Bellows 6 and 7 are alike in construction and have a plurality of annular convolutions of torus contour. Bellows 6 is closed at its lower end by disc 8 having aperture 9 at its center. The upper end of bellows 6 is sealed by disc 11 which in turn is attached to cylindrical slug 12. Cap 13 is provided with a circular recess, adapted to receive disc 8, and is also provided with an axial opening through which extends bushing 14. Valve member 15 is carried within the bore of bushing 14 and contains ball check 16 which is normally urged downward by the pressure of fluid within bellows 6 and also by resilient washer 17.

Prior to use, bellows 6 is filled with a fluid 18 which may be either a gas or a liquid as determined by particular requirements, the nature of which will become apparent hereinafter. The fluid 18 is admitted into the bellows capsule (6) via opening in valve member 15, and is thereafter sealed by ball check 16.

Cap 13 is provided with an annular flange portion 19, which holds it in position with respect to body 1, after which fixture 2 is attached to cap 13 and to body 1 by means of suitable fasteners such as bolts 21 and 22.

Slug 12 is freely and slidably supported within body 1, and being attached to the upper end of bellows 6, via disc 11, also moves therewith. Bellows 7 is identical in construction with bellows 6 and is similarly provided with a valve assembly permitting it to be filled with a pressurized fluid. The upper end of bellows 7 is secured to the upper end of body 1 and to the lower end of cylinder 3. The lower end of bellows 7 is attached to the upper end of slug 12; thus, slug 12 will be caused to move downwardly when bellows 7 distends and bellows 6 compresses, or conversely. Such movement of slug 12 is relative, however, since in actual use, slug 12 moves in opposition while the enclosing cylindrical body 1 is rectilinearly translated along the major longitudinal axis of the apparatus, as indicated by arrow 5, with a simple sinusoidal motion. The fixture 2 is coupled directly to the tool which in this case comprises brush 4.

The upper end of brush 4 is provided with a cylindrical shaft portion 23 which extends through, and is guided by, bushing 24 as it is driven up and down. Bushing 24 is held in place by split clamp 25, which in turn is mounted on frame 26. Fastener 27 closes and holds clamp 25 about bushing 24. Frame 26 extends outwardly and upwardly and its upwardly extending portion is provided with a hand grip by means of which the apparatus may be held and/or gripped during use.

By adjusting the fluid pressure within bellows 6 and 7 the relative stiffness of body 1 can be controlled with an attendant adjustment of the Q of the system. This arrangement, as has been mentioned previously, affords a means for selectively determining either the operating frequency of the system or for synchronizing the operating frequency of the system with the resonant frequency of the load element (e.g., brush 4) in those instances where the load element will return a reflected impedance to the system. It should be understood that this reflected load impedance is a portion of the resonant system, and while it may have a considerable mass, such mass will essentially be tuned out by appropriately adjusting the capacitive component of the fluid resonator.

In the embodiment of FIGURE 1 the fluid capacitive resonator is connected mechanically in parallel with the oscillator and the load. However, the system may be designed so that the fluid capacitive resonator is an end-loaded subassembly wherein the tool is directly connected to the oscillator and the fluid capacitive resonator is connected to either the oscillator or to the tool, as determined by practical considerations of the structural characteristics of the tool, or convenience, or both. It should be understood that the oscillator need not be an orbiting mass oscillator of the type shown and described in the above mentioned patent, but may be any suitable means for generating acoustical energy, in a longitudinal mode, of the required frequency and amplitude.

There is shown in FIGURE 2 a modification of the apparatus of FIGURE 1 wherein the tool comprises a knife blade 28 in lieu of the brush 4 of FIGURE 1. Blade 28 is rigidly mounted to shaft 29 by means of rivets 31–34 or other suitable fastening means. Shaft 29 is fixedly attached to fixture 35, which is the counterpart of fixture 2 in FIGURE 1. Frame 26 is provided with hand grip 36, and the remaining parts are identical with those of FIGURE 1.

In the two above-noted examples, described in connection with FIGURES 1 and 2, it is desirable to have an output amplitude, or displacement, of considerable magnitude. That is, a brush or knife operates most effectively when there is a fairly large stroke or translatory displacement.

Looking now at FIGURE 3 there is shown a modification of the invention wherein a capacitive fluid resonator of modified form is used in conjunction with a sonically powered saw. This embodiment is referred to as a piston type resonator capsule. It comprises a cylindrical shell 37 which is closed at either end by means of caps 38 and 39. Piston 41 is freely and slidably mounted within shell 37. Chamber 42 is filled with a pressurized fluid via the valve indicated generally at 43. Chamber 44 is also filled with a pressurized fluid and is sealed therein by four ring seals 45–48 of Teflon or nylon, and through which passes shaft 49. Cap 39 is held in place by washer 51 and cover 52. Bolts 53 and 54 secure cover 52 to cap 39 and to shell 37.

The upper end of shell 37 is fixedly attached to the output end 55 of the sonic wave generator (not fully shown). The upper end of shaft 49 is secured to piston 41 for movement therewith.

Helical springs 56 and 57 bias piston 41 to a normally centered position within shell 37, and also add to the capacitive reactance of the system.

Shaft 49 carries head 58 which in turn is attached to saw blade 59. Guide shaft 61 is secured to head 58 by means of roll pin 62, and extends upwardly in sliding engagement with nylon bushing 63. Bushing 63 is mounted in a receiving opening in frame 64, the lower end of which carries sleeve bushing 65 through which passes shaft 49. The upwardly extending portion of frame 64 is provided with a hand grip 66 for holding the apparatus while in use.

FIGURE 4 illustrates further the manner in which saw blade 59 is secured to head 58 and to shaft 49. Rivets may be used to fasten blade 59 to head 58, one rivet being indicated at 67.

In the apparatus of FIGURES 3 and 4, the energy output from the end 55 of the sonic wave generator (not shown) will cause shell 37 to move up and down in the direction of arrow 68, at some sonic frequency. This motion is rectilinear and the velocity varies almost sinusoidally. This cyclic motion is transferred to piston 41 via the fluid in chambers 42 and 44, which is turn is acted upon by the enclosed shell 37.

Thus, the capacitive resonator is mechanically in series in the system between the generator output (55) and the tool input (shaft 49). This is in contrast to the shunt arrangement of the first-described embodiment of FIGURES 1 and 2.

As in the first instance, the Q of the system, and hence the natural or resonant frequency of the system will be determined by the stiffness of springs 56 and 57, and the fluid in chambers 42 and 44, or conversely.

The piston 41 is a lumped inductance and has an appreciable mass. The fluid in chambers 42 and 44 supplies the desired capacitive reactance to the system. Piston 41 will cyclically oscillate along the major axis of shell 37 at the resonant frequency of the combined generator-resonator-tool system.

Preferably the sonic wave oscillator for driving end 55 should be of the roller oscillator type, but this is not a necessary limitation of the present invention.

Having described the invention in terms of particular embodiments, it will now be more readily seen how the combination of an orbiting mass oscillator and the fluid resonator capitance of the present invention, give a particularly novel result, namely, the achievement of relatively high resonant frequencies, high stability, and frequency uniformity. Because the capacitive elements of the system can be made to have fairly large cross-sections, thereby presenting a substantial elastic stiffness, they are capable of handling, in resonance, a very large mass in the dynamic part of the circuit. This means that the total combination, including the workload to which the system is being applied, results in a fairly high acoustic Q. This Q factor is very important in relation to the orbiting mass oscillator because it is the acoustic Q which tends to maintain the orbiting mass oscillator under a stable controlled condition in spite of its tendency to overspeed when not working into a resonant system.

The gas or liquid type capacitance, because of its ability to handle large masses, is able to maintain the system at a relatively high resonant frequency even in a situation where the workload itself tends to load down the system with undesirable masses. In spite of the mass loading caused by the workload, the fluid capacitance maintains the frequency at a high level, such level being especially effective in an orbiting mass oscillator since it requires a fairly high frequency in order to obtain substantial force output from the orbiting or rolling mass. That is, any system which causes a large frequency drop, whenever the workload is applied, is inherently a poor system to use in combination with an orbiting mass type of oscillator. This is due to the fact that such an oscillator requires that a fairly high operating frequency be sustained, inasmuch as its output is a function of centrifugal force. Since centrifugal force is a frequency-squared function, such a system is highly sensitive to frequency.

As will appear from the ensuing detailed description of additional embodiments of the invention, fluid resonators constructed in accordance with the invention, and particularly gas-filled resonators, are somewhat non-linear and therefore tend to exhibit an increase in operating frequency with an increase in the amplitude of the applied acoustic energy. This is particularly effective with the orbiting mass type of oscillator because it means that ordinarily there will be an increase in acoustic Q with an increase in power loading. This characteristic, attributable to this novel combination, is unique as regards acoustic systems of this general type.

Notwithstanding the differences in the manner in which the fluid resonators are coupled into the acoustic circuits of the apparatus of FIGURES 1 and 3, both of these embodiments share certain common characteristics. Specifically, both embodiments comprise a mass inductance (in the form of a piston or balance weight) located between two fluid capacitances, with another inductance being provided by the cylindrical body or housing structure of the apparatus. In effect there are two inductances and two capacitances forming the LC circuit. Actually, the two confined fluid bodies, one on each side of the mass element (slug 12 of FIGURE 1 and/or piston 41 of FIGURE 3) coact together as a single capacitance. Moreover, the cylinder comprising body 1 in FIGURE 1, or shell 37 in FIGURE 3, acts as a single inductance, oscillating 180° out of phase with the oscillation of the mass element (12 or 41). In both embodiments, the body of the sonic wave generator is attached to the cylindrical body or shell and to the tool connection, and thus adds to this inductive reactance. Usually, therefore, it is desirable to make the body or shell member and the body of the sonic wave generator as light as possible, so as to keep the impedance down and the cyclic motion up, at the location of the generator output to the useful work, which may comprise brush 4 or saw blade 59. Since the resonator assembly tunes out the mass of the body or supporting structure of the sonic wave generator primarily along only one path, the vibratory motion is mainly in only one direction, which is desirable in most cases and particularly those of the above described applications.

In the embodiment of FIGURES 1 and 2 the work tool is secured to the body 1, as mentioned above, adding its mass to the total inductive reactance of the circuit.

It does not matter whether the primary inductive mass is located between the two ends of a secondary mass reactance, as in the case of the embodiment of FIGURE 1, or whether the primary inductance is a single mass centrally positioned as a piston in a cylinder, as in the case of the embodiment of FIGURE 3, since in both instances it is a "lumped mass" between two capacitances. In either embodiment, the resonator is used primarily to function at a sonic frequency to "tune out" the inertia of the mechanical oscillator body and the inertia of the tool member. In this way the inductive impedance of the entire system approaches or becomes zero, and the only impedance that the force-generating element in the sonic wave generator sees is the resistive impedance of the work load. This results in the total system being frequency dependent. Accordingly, to obtain a desired frequency, the volume and/or pressure of the confined fluid, in relation to the above-mentioned inductive masses, is selected to obtain the desired operating (resonant) frequency.

There is shown in FIGURES 5–8 still another embodiment of a sonic tool incorporating a fluid resonator constructed in accordance with the invention. This embodiment is provided with a chipping tool or chisel head which is reciprocated at a sonic frequency. Looking first at FIGURE 5 there is shown a side view of the apparatus comprising frame 71 having a pair of hand grips 72 and 73 attached thereto.

Cylindrical body 74 encloses the resonator capsule and has its upper end fixedly attached to housing 75 of a roller-type sonic wave generator. The upper end of housing 75 is attached to the center of cross bar 76 by means of a pair of bolts 77 and 78, as can best be seen in FIGURE 6. Cross bar 76 is attached to frame 71 by means of bolts 79 and 81.

Cross bar 76 is fabricated from a vibratorily elastic material such as steel or other suitable material. A lateral mode, resonant standing wave is established in bar 76 in response to the energy supplied thereto by the sonic wave generator. The sonic wave generator housing 75 is attached to the midpoint of bar 76, which is the velocity antinode, and bolts 79 and 81 are located at nodal points.

Figure 7:
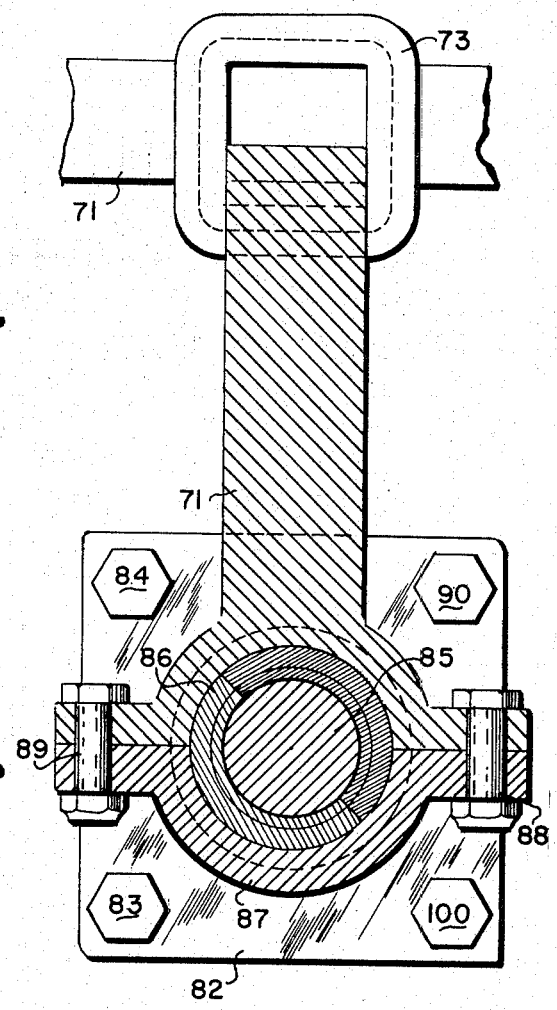
FIGURE 7 is a fragmentary sectional view taken along line 7—7 of FIGURE 6.

The lower end of body 74 is closed by cap 82, which is secured thereto by means of bolts 83, 84, 90 and 100, as seen in FIGURE 7. Stem 85 extends downwardly from cap 82 through nylon isolator bushing 86 which in turn is supported by split clamp 87. Fasteners 88 and 89 hold clamp 87 in a closed position and clamp 87 depends from the lower end of frame 71.

The lower end of stem 85 is provided with a chisel blade 91 or other desired tool head. The clamp and bushing arrangement are more clearly shown in FIGURE 7.

Looking now at FIGURE 8 there is shown the interior construction of the resonator capsule of the apparatus of FIGURES 5 and 6. As can be seen, cylindrical body 74 is closed at either end by means of end covers 92 and 93. End cover 92 has a flanged rim which serves to locate it with respect to the body 74. Cover 92 is also provided with a recessed upper central portion which is adapted to receive the lower end of helical spring 94. End cover 93 is similarly flanged and provided with a recessed central area on its lower surface which is adapted to receive the upper end of helical spring 95. Piston 96 is slidably supported within body 74 and engages the lower end of spring 95 and the upper end of spring 94, which arrangement causes piston 96 to be centered with respect to the ends of body 74.

An inlet valve, indicated generally at 97, is located within a receiving aperture in end cover 93. Valve 97 is identical in construction to the valve assembly described previously in connection with the embodiment of FIGURE 1. A fluid, which may be either a gas or liquid, is introduced into chambers 98 and 99 via valve 97. This arrangement of the confined fluid (in chambers 98 and 99) will be seen to comprise two fluid capacitances physically located on either side of a mass inductance (96).

The force-producing element of the sonic wave generator, located within housing 75, comprises an eccentric roller 101 which is caused to move through an orbital path about the interior cylindrical surface of housing 75. Any suitable prime mover may be employed to drive roller 101 and may be, for example, an electrical or hydraulic motor, or an air-driven turbine. The centrifugal force developed by the roller (101) and housing (75) assembly will set cross bar 76 into resonant vibration with the velocity antinode located in a plane passing through the vertical centerline of the tool. This centerline is indicated at 102. This resonant vibration will also cause a downward vibratory component to be imparted to the upper end of body 74. Inasmuch as chisel blade 91 is rigidly attached to body 74, by means of stem 85 and cap 82, it will also be caused to move up and down in the direction of arrow 103 in response to the sonic vibratory output of the apparatus. While body 74 is moving up and down, piston 96 will maintain a relatively opposed motion, during which time the fluid in chambers 98 and 99, and springs 94 and 95, will be alternately compressed and expanded. This arrangement comprises a shunt-coupled resonant circuit similar to the circuit arrangement of the apparatus of FIGURE 1.

The fluid-filled resonator capsule of FIGURE 8 is especially effective in a tool of the type described in FIGURES 5 and 6 wherein the sonic wave generator has only a single orbiting mass, rather than a generator having the usual pair of orbiting mass elements, rotating in opposite directions for the purpose of obtaining a uniform linear vibration path. This special characteristic is due to the "single-direction" property of the fluid-filled resonator which acts to confine the force output of the sonic wave generator to one major direction and therefore a more usable direction of the vibration path. Additional ones of the previously enumerated advantages of the system of the present invention are also obtained by this arrangement. In particular, since the output of the sonic wave generator is a function of centrifugal force, a fairly high sustained frequency is desired from the orbiting mass oscillator, in order to obtain useful output energy levels. Inasmuch as centrifugal force is a frequency-squared function, the apparatus is sensitive to frequency and the directional characteristics of the resonant capsule, as it relates to the remainder of the system, permits a high frequency to be maintained and prevents a large frequency drop from occurring whenever the work load is applied.

The discussion of the invention thus far has been directed to its construction as an integral part of a sonically driven tool. It should be understood however that the sonic resonator may be constructed as a self-contained unit or capsule which may be added as an accessory to any one of the numerous sonically driven systems well known to those versed in the art. There follows a description of a variety of such fluid resonator devices, constructed as integral units for inclusion in various types of sonically driven systems.

Figure 9:
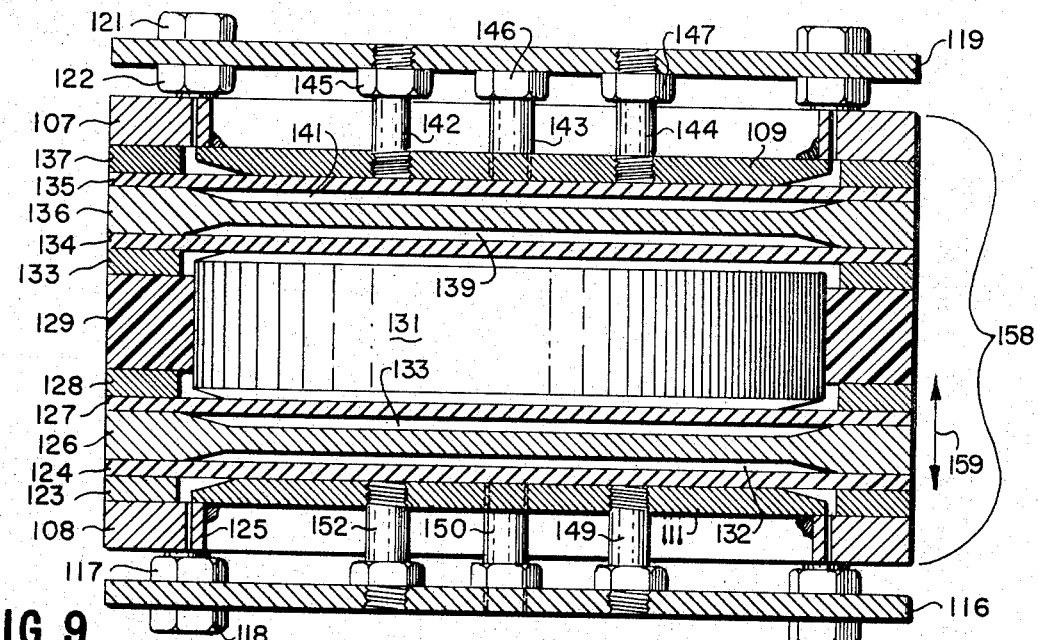
FIGURE 9 is an elevation, in medial section, of a sonic resonator constructed in accordance with the invention.
Figure 10:
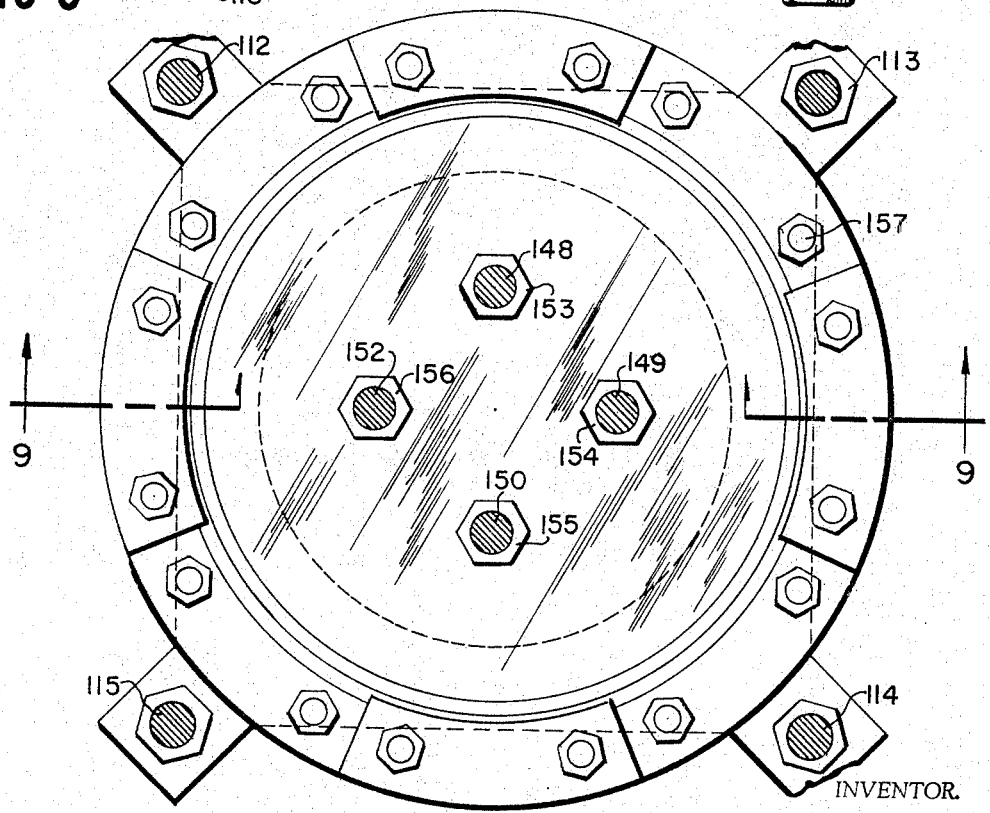
FIGURE 10 is a top plan view of the apparatus of FIGURE 9.

Looking now at FIGURES 9 and 10, there is shown an embodiment of a resonator capsule designed for shunt connection, as an integral unit, between a sonic wave generator and a driven element. This resonator capsule comprises an exterior, frame-like, supporting structure within which is located a laminated subassembly. The interior of the subassembly contains the capacitive and inductive elements. The laminated subassembly structure comprises end members 107 and 108, discs 109 and 111, and the elements located therebetween.

The exterior supporting structure comprises bottom plate 116 and top plate 119, each having a generally square planar area and four corner tabs extending therefrom through which pass bolts 112–115 for the purpose of holding the exterior supporting structure together. The arrangement of the corner tabs can be seen in FIGURE 10. The threaded end portions of each of the four bolts (112–115) are provided with pairs of nuts urging against opposite surfaces of the corresponding tabs of the plate. A typical pair of nuts, secured to a tab of bottom plate 116, are shown at 117 and 118, and are threadedly carried on the lower end of bolt 112. Similarly, nuts 121 and 122 are threadedly carried on the upper end of bolt 112 and are secured to a corner tab of top plate 119. The remaining three bolts (113–115) are similarly provided with pairs of nuts engaging corresponding ones of the plates 116 and 119, which arrangement holds the bottom plate 116 and the top plate 119 in a spaced-apart parallel configuration.

The laminated subassembly structure is coaxially located between plates 116 and 119 and is made up of a plurality of substantially planar elements, the lowermost of which is end member 108. Spacer ring 123 is located directly above, and abutting, end member 108. A circular diaphragm 124 is located directly above, and is supported at its peripheral edge, by spacer ring 123. Diaphragm 124 is fabricated from a resilient, impermeable material such as rubber. Disc 111 has its upper surface, with the exception of its bevelled edge, in abutment with diaphragm 124. Ring 125 is welded to the underside of disc 111 at its peripheral edge. Circular plate 126 is fabricated from metal and has a central recessed area on both its upper and lower surfaces.

A second resilient diaphragm 127, identical in size and shape to diaphragm 124, and fabricated from the same type of material, has its peripheral edge clamped between the edge of plate 126 and spacer ring 128. Spacer ring 128 may be fabricated from metal and have its upper surface abutting guide ring 129. The primary mass inductance of the device is provided by circular weight 131 which is slidably mounted within guide ring 129. Guide ring 129 may be fabricated from nylon or other material having a low coefficient of friction. Guide ring 129 functions to maintain circular weight 131 in an axially centered position, since the outer edge of weight 131 is in sliding engagement with the inside diametral surface of guide ring 129.

The recessed areas of circular plate 126, together with the facing and enclosing surfaces of diaphragms 124 and 127, define a pair of cavities 132 and 133 which are filled with air or other compressible fluid. The confined fluid in cavities 132 and 133 comprise part of the capacitive reactance of the circuit.

The construction of the portion of the device extending upwardly from weight 131, as viewed in FIGURE 9, is symmetrical with respect to the previously described lower portion. As can be seen in FIGURE 9, spacer ring 133 is similar in construction to spacer ring 128, diaphragms 134 and 135 are identical in construction with diaphragms 127 and 124, respectively, and circular plate 136 is identical in construction to plate 126. Ring 137 is located between diaphragm 135 and end member 107 and is similar in construction to ring 123. The lower surface of disc 109, with the exception of its bevelled edge, is in abutment with the upper surface of diaphragm 135. Ring 138 is welded to the upper peripheral edge of disc 109.

The relieved or recessed central area of circular plate 136, together with the enclosing facing surfaces of diaphragms 134 and 135 define a pair of cavities 139 and 141 which are filled with a compressible fluid such as air. This confined fluid comprises the remaining capacitive reactance of the circuit.

A plurality of bolts 142–144 are threadedly engaged with, and extend between, top plate 119 and disc 109. Locking nuts 145–147, coacting with bolts 142–144, maintain the desired spacing between disc 109 and top plate 119.

The opposite end of the apparatus is similarly provided with a plurality of bolts 148, 149, 150 and 152 which extend between disc 111 and bottom plate 116, and are locked in place by corresponding ones of the locking nuts 153–156.

The laminated subassembly supported between end member 116 and end member 119 is held together by a plurality of radially-disposed, transversely extending bolts, a typical one of which is indicated at 157 in FIGURE 10. The laminated subassembly may be considered as a unit, and this unit indicated at 158. The supporting connection between unit 158 and the exterior frame is at the interfaces between discs 109 and 111, and diaphragms 135 and 124, respectively. Unit 158 is located at the velocity node of the system during operation and therefore does not move relative to the exterior supporting structure. The stiffness of the coupling between unit 158 and its exterior supporting structure is adjusted by suitably altering the spacing between plate 119 and disc 109, and plate 116 and disc 111.

Top plate 119 and bottom plate 116 move together as a unit by reason of their being held together by the four transversely extending bolts 112–115. This combination (116, 119) comprises the velocity antinode of the system and it is this exterior supporting structure which is to be physically inserted into the system between the source of the sonic wave energy and its load. For example, an orbiting mass oscillator may have its output element rigidly attached to plate 119 and a tool which is to be sonically driven may be fixedly attached to plate 116. A cyclical vibratory motion imparted to the structure in the direction of arrow 159 will result in weight 131 tending to move in opposition to elements 116 and 119 while the air or other fluid confined within cavities 132 and 133, and 139 and 141, is cyclically compressed and expanded. This arrangement comprises a diaphragm-type air spring, wherein the fluid in cavities 132 and 133 will be compressed at the same instant in time when the fluid in cavities 139 and 141 is being expanded. For example, a downstroke applied to disc 109, which moves with plate 119, will cause diaphragm 135 to be moved downward. This will cause the fluid in cavity 141 to be compressed and the fluid in cavity 132 to be expanded. The movement of weight 131 will cause it to counteract the movement at 109 and 111 as assembly 158 continues to remain stationary. Simultaneously, the fluid in cavity 133 will be expanded and the fluid in cavity 139 will be compressed.

Weight 131 comprises the counterbalancing inductive reactance element or mass reactance of the system, and the fluid confined within cavities 141, 139, 133, and 132, comprise the capacitive reactance of the system. The system may be tuned to a desired resonant frequency by varying the static pressure within cavities 141, 139, 133, and 132. As mentioned previously, this may be accomplished by pressure charging and suitably adjusting the space between discs 109 and 119, and 111 and 116, respectively.

The overall size of the apparatus shown in FIGURES 9 and 10 will be determined by the energy requirements of the system into which it is inserted and may be scaled up to large proportions in those instances in which substantial amounts of acoustical energy are to be transmitted.

Figure 12:
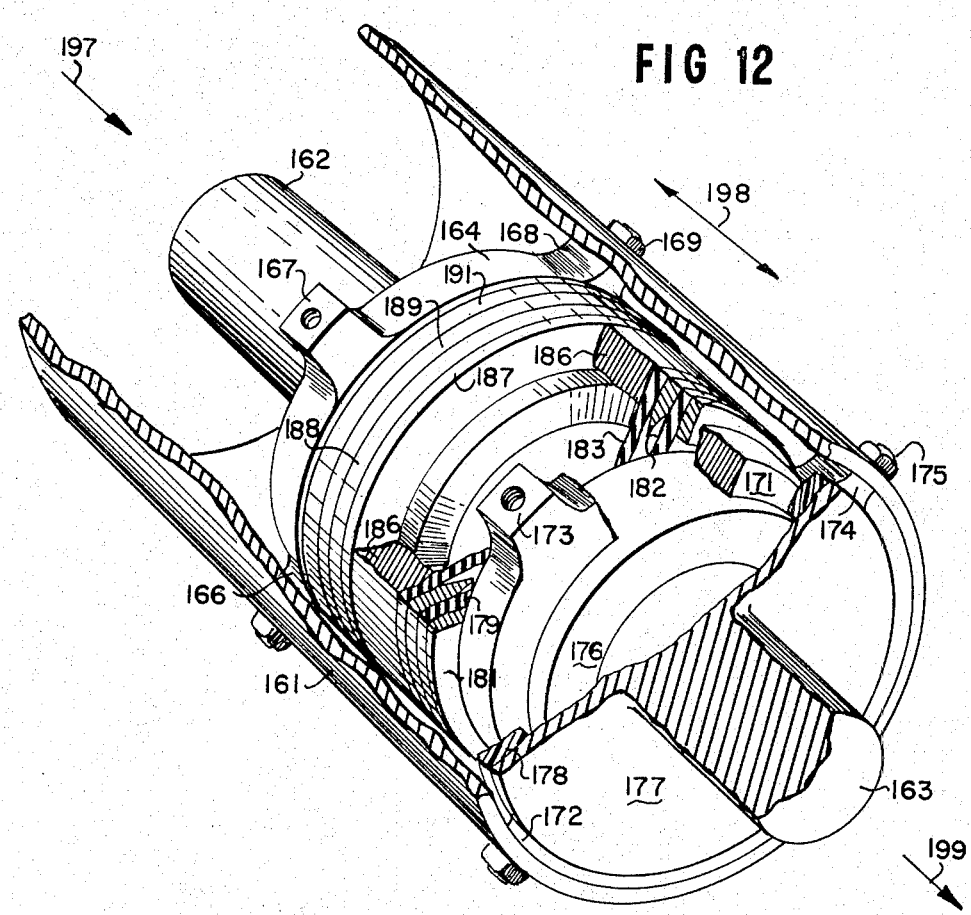
FIGURE 12 is a perspective view, partially broken away, of an alternate embodiment of a fluid resonator capsule constructed in accordance with the invention.
Figure 13:
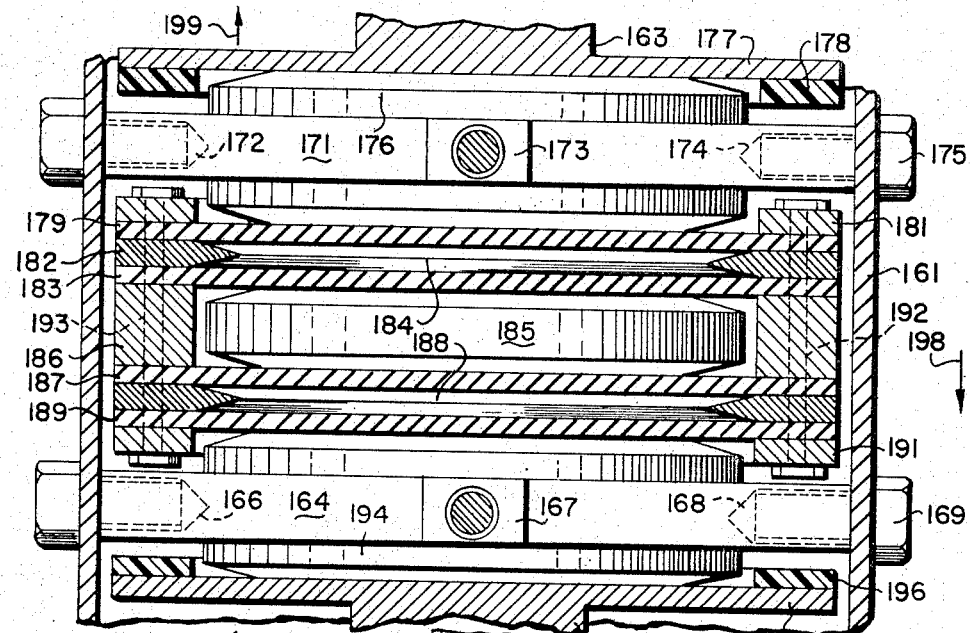
FIGURE 13 is an elevation, in medial section, of a further embodiment of a fluid resonator capsule according to the invention.
Figure 14:
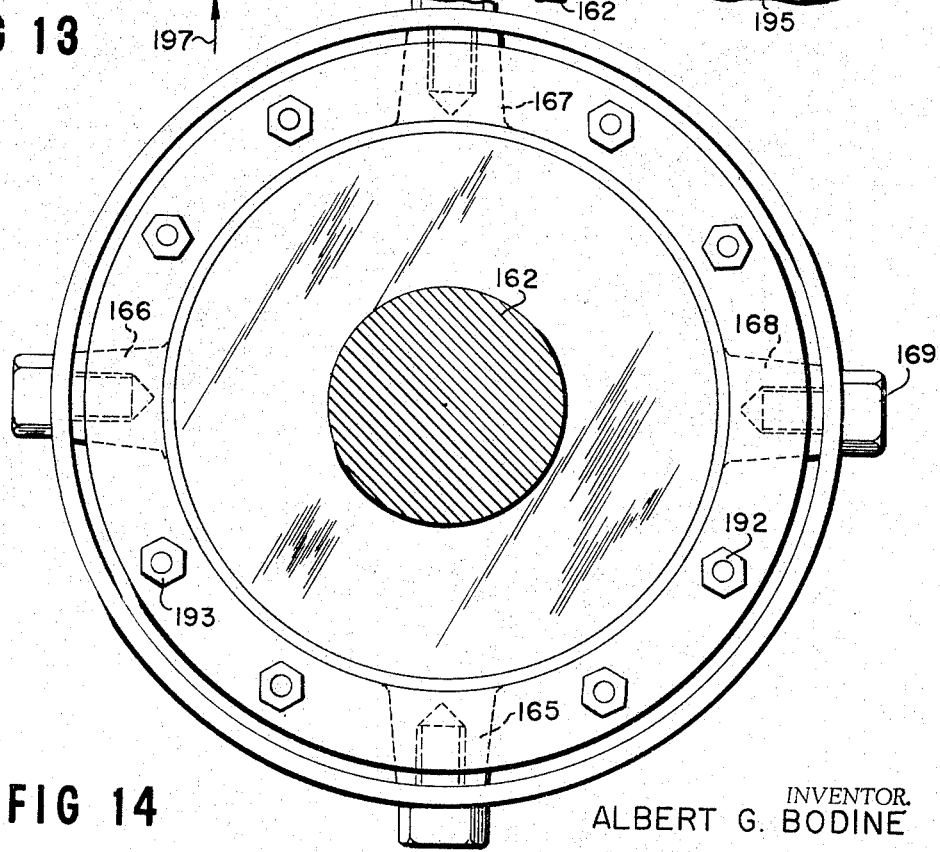
FIGURE 14 is a top plan view of the apparatus of FIGURE 13.

Looking now at FIGURES 12–14, there is shown still another embodiment of a diaphragm type of fluid resonator constructed as an integral unit for insertion into a sonically driven system. This device comprises a cylindrical outer shell 161 enclosing the resonator assembly. The device is symmetrical in its construction and either end may be used for the input, with the opposite end being used for the output. However, for convenience in describing the construction and functioning of the device, it will be convenient to refer to stem 162 as the input and stem 163 as the output. That is, a longitudinally propagated sonic vibration, imparted to stem 162, from a sonic wave generator, will result in the longitudinal wave being transmitted to stem 163 which is applied to a load or member to be sonically driven. Stems 162 and 163 are shown to have a circular cross-section but it should be understood that they may have any convenient cross-sectional shape.

Member 164 is provided with a plurality of radially disposed bosses 165–168 by means of which it is secured to the outer shell 161, as can best be seen in FIGURE 14. Bosses 165–168 are provided with threaded openings for receiving bolts such as the one indicated at 169 for securing guide member 164 to the outer shell 161. Guide member 171 is identical in construction to guide member 164 and is similarly attached to outer shell 161 by means of four bosses, three of which are indicated at 172–174, and a corresponding number of bolts, one of which is indicated at 175. Guide member 171 slidably supports weight 176.

Guide member 164 similarly provides a sliding support for circular weight 194. Stem 163 is provided with a flange portion 177 which is attached for movement therewith. Resilient ring 178, which acts as a stop by limiting the travel of stem 163 and flange portion 177, is attached to the interiorly facing surface of flange portion 177 near the periphery thereof. The opposing planar surfaces of weight 176 have bevelled edges and the lower central area (as viewed in FIGURE 13) is bonded to resilient, impermeable, diaphragm 179. End ring 181, having an interior diameter larger than the external diameter of weight 176 abuts diaphragm 179. The opposite side of diaphragm 179 abuts spacer 182. The lower side of spacer 182 abuts resilient, impermeable, diaphragm 183. Thus the spacer 182 in conjunction with the enclosing surfaces of diaphragms 179 and 183 provides a fluid-tight cavity 184 which is filled with air or other compressible fluid.

Weight 185 is in the form of a circular disc having opposing bevelled surfaces. The upper planar surface of weight 185 is bonded to the lower surface of diaphragm 183.

The remaining structural elements on the opposite side of weight 185 are symmetrical with the elements thus far described. That is, diaphragm 187 corresponds to diaphragm 183, spacer 188 corresponds to spacer 182, diaphragm 189 corresponds to diaphragm 179, ring 191 corresponds to ring 181.

The stem 162 is provided with a flange portion 195 and a resilient ring 196 limits its travel.

Elements 179, 181–183, 186, 187–191 are all secured together at their peripheral edge by a plurality of radially-disposed, transverse, bolts, and move together as a unit. Typical ones of the transverse bolts are indicated at 192 and 193, in FIGURE 14. The application of a longitudinally propagated sonic wave to stem 162, in the direction of arrow 197, will cause weight 194 to move in the same direction. The internal assembly, comprising the elements held together by bolts 192 and 193, is located at the resonant node of the system and therefore does not move but remains relatively stationary. At the same time, weight 185 which is supported within the center of the central assembly by resilient diaphragms 183 and 187, will be caused to move in an opposite direction as indicated by arrow 198. At the same time, weight 176 and stem 163 will move in the direction of arrow 199, which is the same as the direction of the input wave indicated by arrow 197. On the phase reversal of the input wave, weights 194 and 176 will move in the opposite direction to arrow 197, weight 185 will move in the opposite direction to arrow 198, the internal assembly will remain relatively stationary, and the output stem 163 will move in the opposite direction to arrow 199. This cycle of events will cause the fluid in cavity 184 to be compressed while the fluid confined within the cavity defined by diaphragm 187, spacer 188 and diaphragm 189 will be expanded.

In a typical construction, an air-resonator diaphragm-type of device, as shown in FIGURES 12–14 may be made to resonate at 100 cycles per second.

In the foregoing description of the embodiments of FIGURES 1, 3, 5, 9, and 12, reference has been made to the expressions "sonic vibration," "lumped constant" and other specialized terms relating to phenomena familiar to those skilled in the acoustic art. However, certain acoustic phenomena disclosed in the foregoing and hereinafter, are, generally speaking, outside the experience of those skilled in the acoustic art. To aid in a full understanding of these phenomena by those skilled in the acoustics art and by others, certain terms, deemed to be of particular importance will be defined hereinafter.

By the expression "sonic vibration" it is meant elastic vibrations or cyclic elastic deformations, which travel through a medium with a characteristic velocity of propagation. If these vibrations travel longitudinally, or create a longitudinal wave pattern in a medium or structure having uniformly distributed constants of elasticity or modulus, and mass, such elastic vibrations comprise sound wave transmission. Regardless of the vibratory frequency of such wave transmission, the mathematical formulae describing such vibrations uniformly apply and the science is called "sonics." In addition, there can be elastically vibratory systems wherein the essential features of mass appear as a localized influence or parameter known as a "lumped constant" and another such lumped constant can be a localized or concentrated elastically deformable element, affording a local effect referred to variously as elasticity, modulus, modulus of elasticity, stiffness, stiffness modulus, or compliance, "compliance" being the reciprocal of the stiffness modulus. It has been found that these constants, when functioning in a elastically vibratory system of the type under consideration, have cooperating and mutually influencing effects which are completely analogous to like factors in alternating current electrical systems. In fact, in both distributed and lumped constant systems, mass is mathematically equivalent to inductance (a coil); elastic compliance is mathematically equivalent to capacitance (a capicitor); and friction or other pure energy dissipation is mathematically equivalent to resistance (a resistor). Because of these equivalents, elastic vibratory systems of the type under consideration with their mass and stiffness and energy consumption, and their sonic energy transmission properties, can be viewed as equivalent electrical circuits, where the functions can be expressed, considered, changed and quantitively analyzed by using conventional and proven electrical design techniques and formulae. An example of this equivalence will be discussed in connection with FIGURE 11.

"Resonance" in a vibratory system is obtained at the operating frequency at which the reactance (the algebraic sum of mass and compliance reactances) becomes zero. Vibration amplitude is limited under this condition to resistance alone, and is maximized. The inertia of the mass elements necessary to be vibrated does not under this condition consume any of the driving force. By means of the novel sonic circuit of the present invention there is provided enough extra elastic compliance in the circuit so that the mass or inertia of various necessary bodies in the system does not cause the system to depart so far from resonance that a large proportion of the driving force is consumed and wasted in vibrating this mass. For example, a mechanical oscillator or vibration generator of the type normally used must have a body, or supporting structure, for containing the cyclic force generating means. This supporting structure, even when minimal, still has some finite mass, or inertia. This inertia ordinarily comprises a force-wasting detriment, acting as a blocking impedance using up part of the periodic force output just to accelerate and decelerate this supporting structure. However, by use of the elastically vibratory structure in the system, the effect of this mass, or the mass reactance resulting therefrom, is counteracted at the frequency for resonance; and, when a resonant acoustic circuit is thus used, with adequate capacitance (elastic compliance reactance) these blocking impedances are tuned out of existence, at resonance and the periodic force generating means can thus deliver its full impulse to the "work" or load, which is the resistive component of the impedance.

Figure 11:
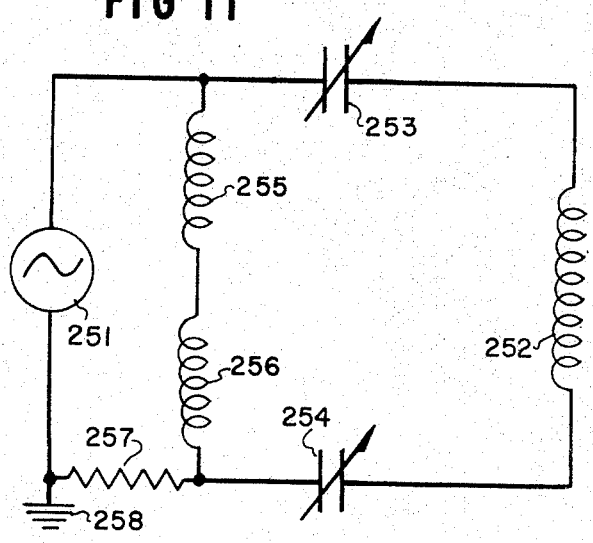
FIGURE 11 is an equivalent electrical network corresponding to the apparatus of FIGURES 9 and 10.

As previously indicated, the structure of the invention, since it comprises a vibrating system exhibiting resonant phenomena, can be explained by employing a dynamical analogy between a mechanical vibrating system and an electrical network excited by an alternating current. This type of analogy is well known to those versed in the art and is described, for example, in "Dynamical Analogies," published in 1943 by D. Van Nostrand Co., N.Y., and in chapter 2 of "Sonics" by Hueter & Bolt, published in 1955 by John Wiley & Sons. Due to the widespread familiarity which engineers have of the characteristics and designs of electrical circuits, the relationships and functions of the elements comprising the mechanical vibrating system of the present invention may be more easily visualized and analyzed by means of an equivalent circuit. There is shown in FIGURE 11 a simplified electrical network which is a dynamical analogy of the structure shown in FIGURES 12–14.

It should be noted that in the mechanical system that the forces acting on the mass are in series, while in the electrical system the components of the system are in parallel. If the forces in the mechanical system were in parallel, then the equivalent electrical system would be put in series. Although certain features of the invention may be applied to various types of tools employing fluid resonators, it will be convenient to describe the invention in terms of the network shown in FIGURE 11 and the embodiment of FIGURES 9–10. Having gained an understanding of this form of the invention, persons skilled in the art will appreciate the manner in which the principles of the invention may be applied to the other embodiments. In the network diagram of FIGURE 11 generator 251 corresponds to the sonic wave oscillator, inductance 252 corresponds to the mass of weight 131, capacitance 253 corresponds to the capacitive reactance of the fluid in cavities 139 and 141. Capacitance 254 corresponds to the capacitive reactance of the fluid in cavities 132 and 133. Inductances 255 and 256 correspond to the masses of plates 116 and 119. The system is referenced to ground 258. The work load corresponds to resistance 257. It should be understood that the network is considerably simplified and ignores many second order effects including the inherent mass (inductive) reactance of the inter-connecting structural elements, the oscillator housing, the tool fitting, etc. While the mass of the mechanical system is a lumped constant, hence incapable of being selectively varied, the capacitive reactance portions of the mechanical system comprises the fluid filled cavities 184 and 190 and may be selectively varied by adjusting the static fluid pressure therein. Thus, in the analogous network capacitors 253 and 254 are shown as variable capacitors which may be selectively adjusted to obtain the circuit parameters desired. This variable parameter permits the resonant frequency of the system to be arbitrarily shifted to make the system self-regulated as regards frequency.

Figure 15:
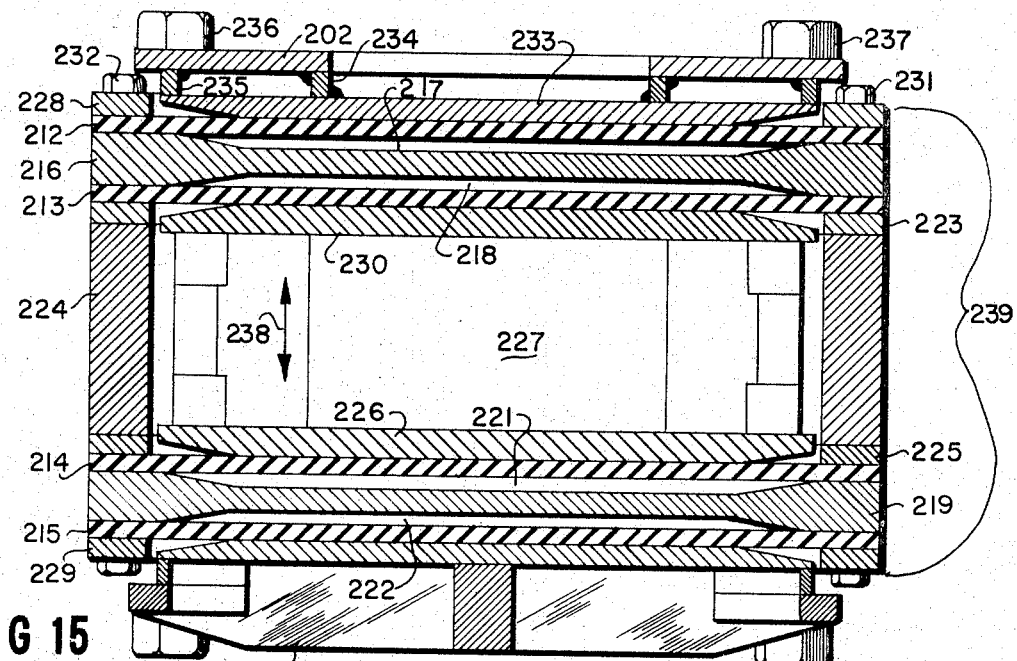
FIGURE 15 is an elevation, in medial section, of a modified fluid resonator of the invention.
Figure 16:
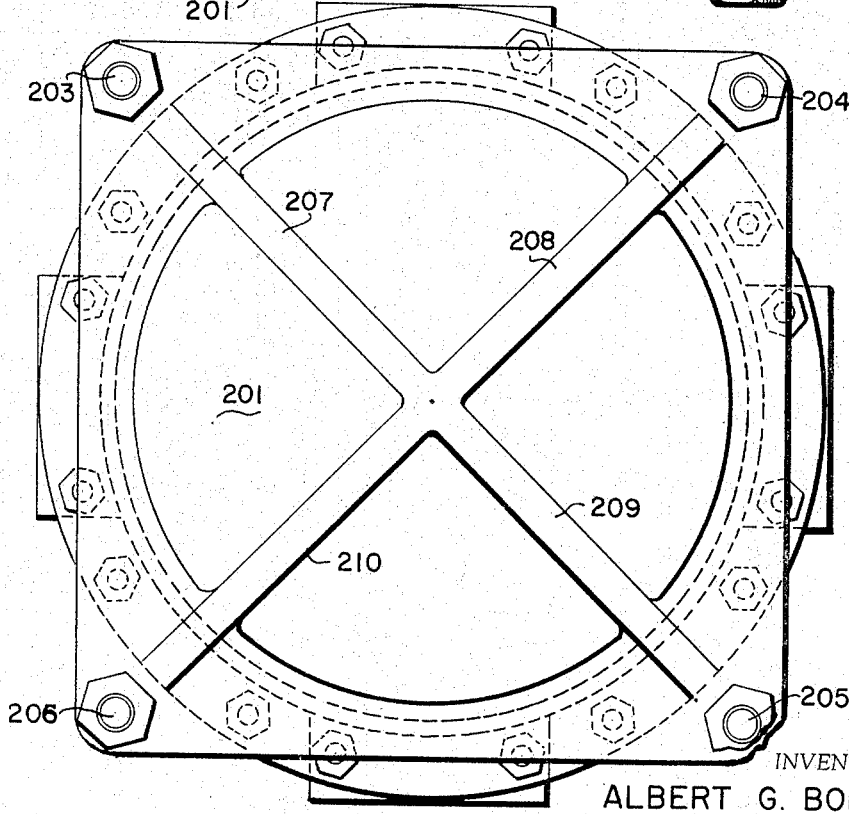
FIGURE 16 is a bottom plan view of the apparatus of FIGURE 15.

There is shown in FIGURES 15 and 16 still another embodiment of a diaphragm type of fluid resonator constructed in accordance with the invention, in which the sonic wave generator is located internally within the resonator capsule. The overall structure is carried between top plate 202 and bottom plate 201 which are bolted together by means of four bolts (203–206) at the four corners of the top and bottom plates.

Top plate 202 may be fabricated in the form of a casting having integral ribs 207–210 in order to provide a high degree of rigidity. The assembly includes four diaphragms 212–215 which are circular in shape and preferably are fabricated from a heavy flexible material such as fabric-reinforced rubber. Spacer disc 216 has a central recessed area on both faces, and is located between diaphragms 212 and 213. The recessed area of spacer disc 216 forms cavities 217 and 218. Similarly, spacer disc 219 is provided with recesses which, together with diaphragms 214 and 215 define cavities 221 and 222. Ring 223 is located between diaphragm 213 and cylindrical housing 224. Similarly, ring 225 is located between diaphragm 214 and cylindrical housing 224. Circular weights 226 and 230 engage the central area of the adjacent surfaces of diaphragms 214 and 213, respectively. These weights (226 and 230) provide a part of the inductive mass of the circuit. A sonic wave oscillator or sonic wave generator is contained within enclosure 227 and may be either an orbital mass oscillator, a gyrating mass oscillator, or other mechanism capable of generating a sonic wave output of appropriate frequency and power, and may be any one of the various types of mechanisms described in the aforementioned patents.

The stationary structure comprises elements 212–216 and 219, 223–225 together with rings 228, 229 and their transversely extending attaching bolts, typical ones of which are indicated at 231 and 232. As can be seen in FIGURE 16, there are a plurality of radially disposed bolts which extend through the stationary structure, bolts 231 and 232 being but two of such bolts.

Cavities 217, 218, 221 and 222 are filled with air or other compressible fluid, preferably at a mean pressure of 10–30 p.s.i. The load device is driven from plate 233, which is welded to concentric rings 234 and 235, and which are in turn welded to plate 202. Suitable fastening means, such as bolts 236 and 237 are provided on plate 202 to permit attachment of the load device.

In operation the enclosure 227 will cyclically move in the direction of arrow 238 while the subassembly indicated at 239 remains stationary. In a typical construction the overall device will have a resonant frequency of approximately 60–80 cycles per second and the inductive mass will have an oscillatory amplitude of approximately ¼ inch.

There are other applications utilizing sonic energy which require that very high forces be generated but without large displacements. Such a situation is exemplified in the apparatus of FIGURES 17–19 wherein the driven element or load comprises a fixture and a workpiece carried thereby and which is to be abraded and/or polished by means of a particulate abrasive. The workpiece is immersed in a container of loose abrasive particles and thereafter sonically vibrated so that the interface between the moving workpiece and the abrasive will result in the the desired polishing action. In a typical example, the workpiece may comprise an engine block which is to be polished. In this instance no advantage is derived from displacing the workpiece over a large distance as compared with the average size of the abrasive particles into which it is immersed and sonically vibrated. Thus, a high-force low-amplitude output is preferable to a long-stroke, relatively low-force, output as in the case of certain of the above-described devices such as the brush tool of FIGURE 1.

Figure 17:
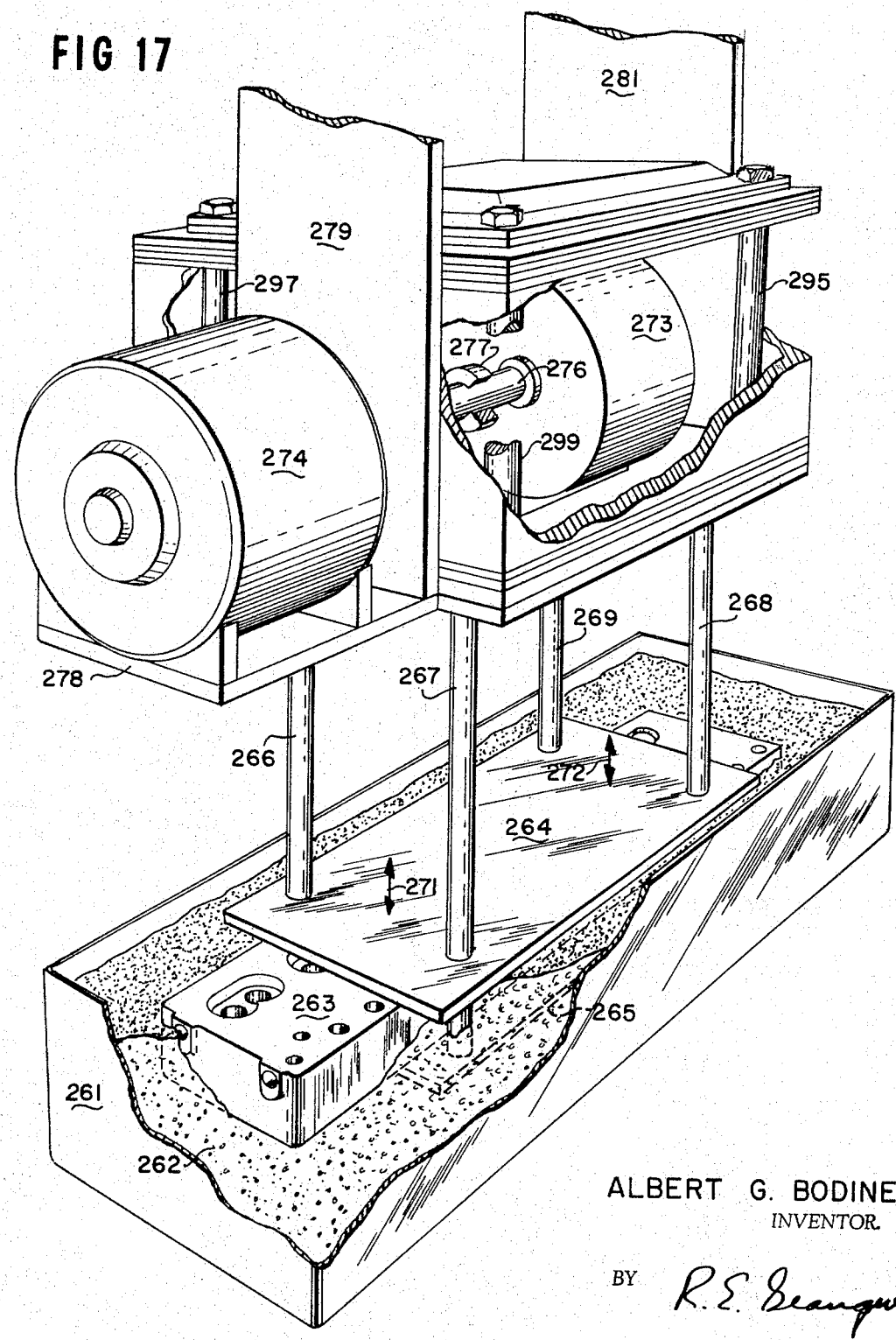
FIGURE 17 is a perspective view, partially broken away, illustrating the application of the fluid resonator of the invention to a casting cleaning machine.
Figure 18:
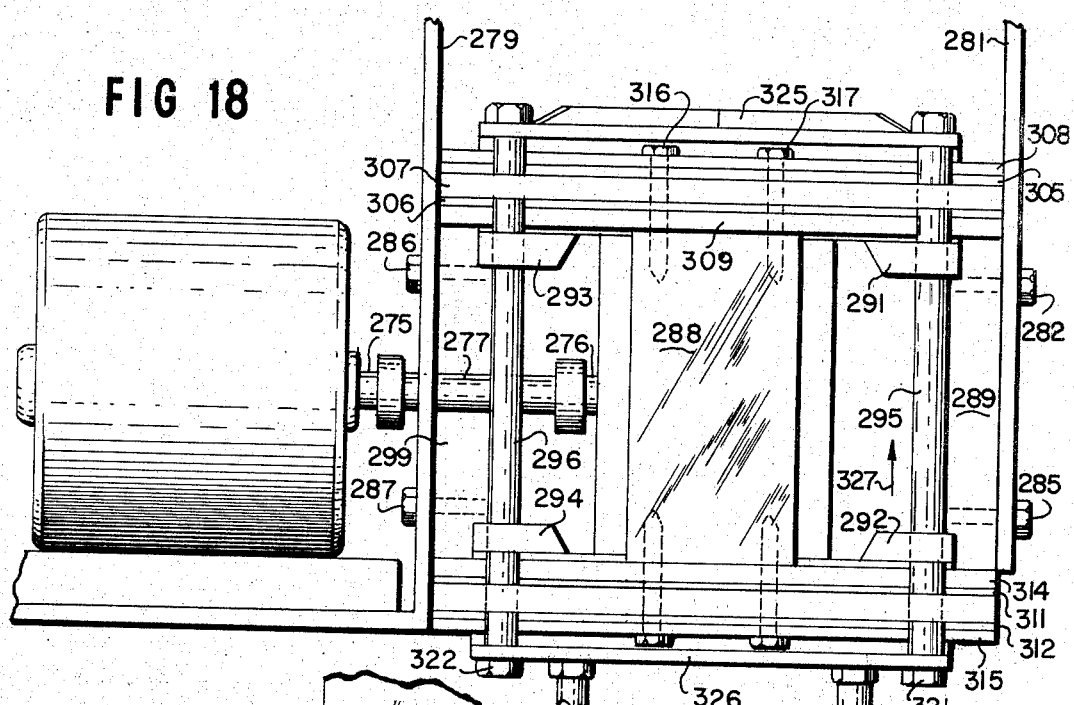
FIGURE 18 is a fragmentary side elevation of the sonic oscillator portion of the apparatus of FIGURE 17.

Looking first at FIGURE 17 there is shown an open container 261 holding a supply of powdered abrasive 262. The workpiece, which in this instance is engine cylinder head 263 is clamped between fixture plates 264 and 265. Fixture plates 264 and 265 depend from four shafts 266–269. During operation, shafts 266–269 are cyclically reciprocated at sonic frequencies, in the direction of arrows 271 and 272. The sonic vibrations are generated by a roller-type orbiting mass oscillator indicated generally at 273 in FIGURE 17, and which will be described in greater detail in connection with the description of FIGURES 18 and 19. The prime mover comprises motor 274, which, for example, may be an electric motor which has its output shaft 275 (shown in FIGURE 18) coupled to the oscillator input drive shaft 276 of the oscillator 273 by means of flexible coupling 277. Motor 274 is supported upon bottom plate 278, which in turn is attached to vertical end plate 279.

The fluid resonator portion of the apparatus is similar to the type previously described in connection with FIGURES 15 and 16 insofar as it has a sonic wave generator centrally disposed with respect to the surrounding fluid resonator structure. The stationary portions of the fluid resonator are supported between end plates 279 and 281. Bolts 282–287 secure these stationary portions to corresponding ones of the end plates, as will appear hereinafter. There are two relatively movable subassemblies, each of which moves in opposition to the other, and both of which move with respect to the stationary end plates 279 and 281, and the parts fastened thereto. The first of these two movable subassemblies includes the oscillator 273 which is attached to guide lugs 291–294, for rectilinear translation with respect to connecting rods 295–298 (see FIGURES 17–19). That is, guide lugs 291–294 are slidably supported with respect to rods 295–298.

Connecting rods 295–298 are also movable as an ensemble with respect to the stationary end plates 279 and 281, and serve to support and carry the second movable subassembly. Guide lugs 301–304 are secured to the stationary subassembly and guide the rectilinear translation of connecting rods 295–298 through which they slidably pass. Capacitive reactance is provided by the compressible fluid contained within a cavity defined by the opposing surfaces of diaphragms 305 and 306, spaced apart by spacer member 307. Diaphragm 305 has its upper surface, as viewed in FIGURE 18, in abutment with plate 308. The lower surface of diaphragm 306 is in contact with plate 309. Similarly, a second cavity is bounded by diaphragms 311 and 312, and spacer member 313. Plates 314 and 315 are located in abutment with corresponding ones of diaphragms 311 and 312.

The upper fluid capacitance assembly is fastened together as a laminated structure by bolts 316–320 which extend down through co-axially alined holes in plates 308–309, diaphragms 305–306, and spacer 307, and then into a threaded opening in frame members 288, 289, and 299.

Figure 19:
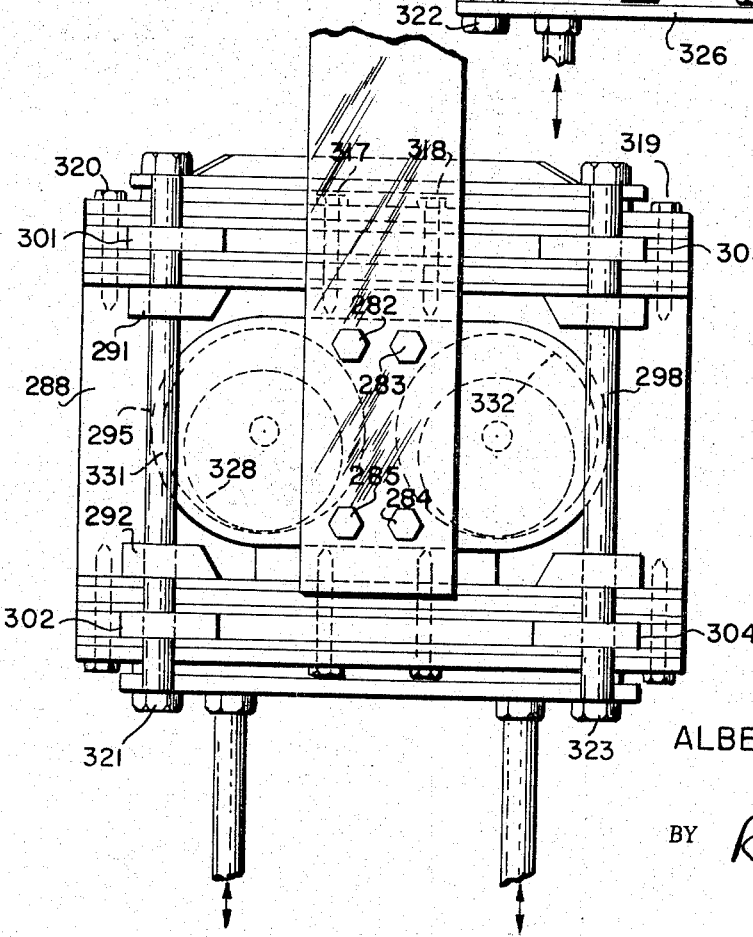
FIGURE 19 is an end view of the apparatus of FIGURE 18.

As can be seen, frame member 299 is fixedly secured to end plate 279 by means of a plurality of attaching bolts 287—287 as can best be seen in FIGURE 19. Connecting rods 295–298 extend vertically through the oscillator-resonator assembly and are provided with threaded ends for receiving nuts 321–324, by means of which rods 295–298 are secured to top plate 324 and base plate 326. The upper ends of connecting rods 295–298 extend through corner holes in top plate 325 and are secured thereto, and the bottom ends of these connecting rods (295–298) extend through, and are secured to, base plate 326.

The movable frame comprising top plate 325, base plate 326, and rods 295–298 is guided for vertical reciprocation by fixed guide lugs 301–304. Similarly, the oscillator subassembly (288) is guided for vertical reciprocation by guide lugs 291–294, which are slidably supported on connecting rods 295–298. This arrangement permits the oscillator subassembly to be vertically displaced in the direction of arrow 327, under the guiding restraint of guide lugs 291–294 moving on connecting rods 295–298. The frame subassembly, carrying the cavity defining parts, and comprising base plate 326 and top plate 325, together with the parts attached thereto, is vertically reciprocated independently of the reciprocating motion of the oscillator subassembly. The parts fixedly attached to end plates 279 and 281 remain relatively stationary. The inductive mass of the system is provided by the structural components which make up the structure for carrying the depending shafts 266–269.

The housing which encloses the orbiting mass oscillator 273 is secured to the movable frame subassembly by any suitable means. A pair of eccentrically driven, contrarotating, rollers 328 and 329 are located within, and bear against the interior surface of, cylindrical raceways 331 and 332, respectively (see FIGURE 19). This will cause a sonic wave to be imparted to the frame subassembly (295–298 and 325–326) to which oscillator 273 is attached. This sonic wave will also be imparted to shafts 266–269 causing them to be reciprocated in the direction of arrows 271 and 272. This vertical reciprocatory wave motion will alternately compress and expand the fluid contained in cavities bounded by diaphragms 305–306 and 311–312. The acoustic circuit thus provided will tune out the reactive impedance of the load comprising fixture plates 264–265 and cylinder head 263 so that the effective acoustic load will appear to be a pure resistance. As a consequence, the workpiece (263) will be driven up and down in the bed of abrasive particles (262) with a very high force and with virtually no energy being expended in accelerating and decelerating the mass of the workpiece.

From the foregoing description of the several embodiments of the invention, it will become apparent to those versed in the art, that a characteristic of the present invention, applicable to all forms thereof, involves the effective delivery of sonic energy to the particular work process involved. The work process, depending upon the particular application involved, will require various combinations of resistive and reactive impedances in order to provide the desired frequency, and/or force, and/or amplitude, output. The circuit values controlling these parameters must be properly met in order that the invention be practiced effectively. However, in all instances, the use of a confined fluid to provide a capacitive reactance, in conjunction with a lumped mass to provide an inductive reactance, will permit the system to resonate at any desired frequency and will also minimize the reactive impedance of the load.

As has been shown, in some embodiments of the invention the inductive mass is conveniently located between two ends of a second mass reactance, but instead of the single mass being a piston slidably supported within a cylinder, it is a lumped mass between two variable-volume fluid-filled enclosures, which enclosures are between the two ends of the second mass above mentioned, and having a configuration comprising a frame or body holding the variable volume enclosures. Other embodiments of the invention comprise a single inductive mass supported for reciprocal translation between a pair of variable volume enclosures. Regardless of the particular physical forms taken by the structure of the invention, the effective circuit comprising variable capacitances and fixed inductances provides the same functional objectives and achieves the several objects of the invention set forth hereinabove.

While there have been shown and described and pointed out the fundamental novel features of the invention as applied to preferred embodiments, it will be understood that various omissions and substitutions and changes in the form and details of the devices illustrated and in their operation may be made by those skilled in the art, without departing from the spirit of the invention; therefore, it is intended that the invention be limited only as indicated by the scope of the following claims.

What is claimed is:

1. A sonic fluid resonator, comprising:
   means defining a fluid-tight variable volume enclosure;
   a body of fluid confined within said enclosure;
   a vibratorily movable mass, reactively coupled to said body of fluid;
   a source of sonic energy coupled to said body of fluid and to said mass, and having a frequency which resonates an acoustic circuit comprising said mass and said body of fluid; and
   an acoustical load element coupled to said circuit, whereby said load element is sonically driven at said frequency.

2. A sonic fluid resonator, comprising:
   means defining a fluid-tight enclosure;
   means for varying the volume of said enclosure;
   a body of compressible fluid confined within said enclosure;
   a source of sonic energy coupled to said enclosure, having a frequency which resonates an acoustic circuit comprising said body of fluid and said volume varying means; and
   an acoustical load element coupled to said circuit, whereby said load element is sonically driven at said frequency.

3. A sonic fluid resonator, comprising:
   first and second fluid spring means;
   a vibratorily movable mass interposed between said first and second spring means and reactively coupled thereto;
   a source of sonic energy having its output coupled to said first and second spring means, and having a frequency which resonates the acoustic circuit comprising said first and second spring means and said mass; and
   an acoustical load element coupled to said circuit, whereby said load element is sonically driven at said frequency.

4. A sonic fluid resonator, comprising:
   first and second fluid spring means having spaced apart opposing ends;
   a vibratorily movable mass interposed between, and connected to, said opposing ends of said first and second fluid spring means;
   a source of sonic energy having its output connected to the other ends of said first and second fluid spring means, and having a frequency which resonates an acoustic circuit comprising said first and second fluid spring means and said movable mass; and
   an acoustical load element coupled to said circuit, whereby said load element is sonically driven at said frequency.

5. A sonic fluid resonator, as defined in claim 4, including:
first and second biasing spring means located on either side of said mass, and in engagement therewith, for centering said mass between said first and second fluid spring means in the absence of sonic energy from said source.

6. A fluid resonator adapted to be coupled into a sonic energy transmission system, comprising:
means defining a first fluid capacitance;
means defining a second fluid capacitance;
a rigid body coupling said first fluid capacitance defining means directly to said second fluid capacitance defining means;
a lumped mass inductance movably supported between said first and second fluid capacitance defining means whereby relative displacement of said mass inductance, in response to the transmission of sonic energy through said system and said body, will result in an increase in the capacitive reactance of one of said fluid capacitance defining means and a concurrent and inversely proportional decrease in the capacitive reactance of the other of said fluid capacitance defining means; and
means for coupling said rigid body into said sonic energy transmission system.

7. A fluid resonator adapted for use in a sonic energy transmission system, comprising:
first and second fluid capacitance means;
a lumped mass inductance interposed between said first and second fluid capacitance means and reactively coupled thereto;
input means for receiving sonic energy from said transmission system and supplying it to said first and second fluid capacitance means; and
output means connected to the acoustic circuit comprising said first and second fluid capacitance means and said lumped mass inductance, whereby sonic energy at the resonant frequency of said acoustic circuit will be returned to said transmission system.

8. A sonic fluid resonator, comprising:
first and second fluid capacitance means;
a vibratorily movable mass interposed between said first and second fluid capacitance means and reactively coupled thereto;
a source of sonic energy coupled to said first and second fluid capacitance means, and having a frequency which resonates an acoustic circuit comprising said first and second fluid capacitance means and said movable mass;
an acoustical load element; and
means for coupling said acoustical load element to said movable mass, whereby said load element is sonically driven at said frequency.

9. A sonic fluid resonator, comprising:
first and second fluid-tight chambers;
a compressible fluid confined within said first and second chambers;
a vibratorily movable mass coupled to said chambers, whereby movement of said mass will increase the volume of one of said chambers and will simultaneously decrease the volume of the other of said chambers;
a source of sonic energy coupled to said first and second chambers, and having a frequency which resonates the acoustic circuit comprising said confined fluid and said movable mass;
an acoustical load element; and
means for coupling said acoustical load element to said movable mass, whereby said load element is sonically driven at the resonant frequency of said circuit.

10. A sonic fluid resonator, comprising:
a fluid-tight enclosure;
a weight movably disposed within said enclosure and having a configuration adapted to divide said enclosure into first and second variable volume chambers, whereby movement of said weight will increase the volume of one of said chambers and will simultaneously decrease the volume of the other of said chambers;
a compressible fluid confined within said chambers;
a source of sonic energy coupled to said enclosure, and having a frequency which resonates the acoustic circuit comprising said confined fluid and said movable weight;
an acoustical load element; and
means for coupling said acoustical load element to said movable weight, whereby said load element is sonically driven at the resonant frequency of said circuit.

11. Apparatus for producing resonant sonic vibrations, comprising:
an output element which is to be sonically driven;
an elastically resonant circuit comprising a vibratorily moving inductive mass reactively coupled to a body of fluid confined in a resonant cavity, said fluid being reactively coupled to said circuit as an elastic capacitance;
a sonic wave generator for producing sonic vibrations at a frequency which resonates said circuit; and
means coupling said output element, said sonic wave generator, and said resonant circuit into a resonant sonic system.

12. Apparatus for producing resonant sonic vibrations, comprising:
a load element which is to be sonically driven;
first and second fluid capacitance means;
a virbratorily movable inductive mass interposed between said first and second fluid capacitance means and reactively coupled thereto and thereby providing an elastically resonant circuit;
a sonic wave generator having its output connected to said first and second fluid capacitance means, said output having a frequency which resonates said circuit; and
means connecting said load element to said first and second fluid capacitance means and thus being driven therefrom.

13. Apparatus for producing resonant sonic vibrations, comprising:
a load element which is to be sonically driven;
first and second fluid capacitance means;
a vibratorily movable inductive mass interposed between said first and second fluid capacitance means and reactively coupled thereto to provide an elastically resonant circuit;
a sonic wave generator having its output connected to said first and second fluid capacitance means, and having a frequency which resonates said circuit; and
means connecting said load to element to said vibratorily movable mass and thus being driven therefrom.

14. A sonic fluid resonator for inclusion in an acoustic circuit, comprising:
a fluid-tight enclosure;
first and second flexible diaphragms dividing the interior of said enclosure into three fluid-tight chambers;
a vibratorily movable mass located in one of said chambers between said first and second diaphragms;
a compressible fluid confined within said other two chambers; and
means for connecting said fluid-tight enclosure to said acoustic circuit in a sonic energy exchange relationship.

15. A sonic fluid resonator, comprising:
a fluid-tight enclosure;

first and second flexible diaphragms dividing the interior of said enclosure into three fluid-tight chambers;
a vibratorily movable mass located in one of said chambers between said first and second diaphragms and adapted for movement therewith;
a compressible fluid confined within the remaining two of said chambers;
a load element which is to be sonically driven;
a source of sonic energy coupled to said fluid-tight enclosure, and having an output frequency which resonates the acoustic circuit comprising said fluid confined in said two chambers and said movable mass; and
means for connecting said load element to said enclosure in a sonic energy exchange relationship.

16. A sonic fluid resonator comprising:
first and second coaxially aligned fluid-tight bellows;
a compressible fluid confined within each of said bellows;
a movable mass interposed between opposed ends of said first and second bellows and coupled thereto for movement therewith; and
a substantially rigid support means connected to the other ends of said first and second bellows, whereby relative movement between said support means and said movable mass will result in the expansion of one of said bellows and the compression of the other of said bellows.

17. A sonic fluid resonator, comprising:
first and second fluid-tight bellows, each having a first and second end, and the major axis of each of said bellows extending in the same direction;
a compressible fluid confined within each of said bellows;
a substantially rigid support means for connecting the first end of said first bellows to the second end of said second bellows, and having its major axis extending in the same direction as the major axes of said bellows; and
a movable mass interposed between said first and second bellows and coupled thereto whereby displacement of said mass in the direction of said axes will result in the expansion of one of said bellows and the compression of the other of said bellows.

18. A sonically driven tool comprising:
a substantially rigid supporting frame;
an elastically vibratory resonant system mounted on said frame, said system comprising:
    first and second fluid spring means;
    a vibratorily movable mass connected between opposed ends of said fluid spring means for movement therewith;
    sonic energy input means for transmitting sonic energy to said system; and
    output means in sonic energy exchange relationship with said system;
a source of sonic energy carried on said frame having an output frequency which will resonate said system and having its output coupled to the sonic energy input means of said system; and
a tool member movably carried by said supporting frame and drivingly coupled to the output means of said system.

References Cited

UNITED STATES PATENTS 3,202,413    8/1965    Colmerauer    267—34

CHARLES A. WILLMUTH, *Primary Examiner.*

E. ROBERTS, *Assistant Examiner.*